(12) United States Patent
Onishi et al.

(10) Patent No.: US 12,510,144 B2
(45) Date of Patent: Dec. 30, 2025

(54) TRANSMISSION STRUCTURE

(71) Applicant: KANZAKI KOKYUKOKI MFG. CO., LTD., Amagasaki (JP)

(72) Inventors: Kenichi Onishi, Amagasaki (JP); Koji Iwaki, Amagasaki (JP); Terunobu Yoshioka, Amagasaki (JP); Hitoshi Sawada, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/937,611

(22) Filed: Nov. 5, 2024

(65) Prior Publication Data
US 2025/0155008 A1    May 15, 2025

(30) Foreign Application Priority Data
Nov. 14, 2023   (JP) ................................. 2023-193386

(51) Int. Cl.
*F16H 61/66* (2006.01)
*F16H 37/08* (2006.01)
*F16H 47/04* (2006.01)

(52) U.S. Cl.
CPC ............. *F16H 47/04* (2013.01); *F16H 61/66* (2013.01); *F16H 2061/6601* (2013.01)

(58) Field of Classification Search
CPC ........ F16H 61/682; F16H 61/46; F16H 61/30; F16H 47/04; F16H 37/042; F16H 37/046;
(Continued)

(56) References Cited

U.S. PATENT DOCUMENTS

| | | | | |
|---|---|---|---|---|
| 2010/0184551 | A1* | 7/2010 | Hiraoka | F16H 47/04 475/80 |
| 2016/0091078 | A1* | 3/2016 | Fukunaga | F16H 57/021 74/606 R |
| 2020/0124170 | A1* | 4/2020 | Iwaki | B60K 17/10 |

FOREIGN PATENT DOCUMENTS

| | | |
|---|---|---|
| JP | 5822261 B2 | 10/2015 |
| JP | 2020152364 A | 9/2020 |

* cited by examiner

*Primary Examiner* — Tinh Dang
(74) *Attorney, Agent, or Firm* — CANTOR COLBURN LLP

(57) ABSTRACT

[Problem] A hydromechanical continuously variable transmission capable of performing smooth switching among first to third gears in accordance with a vehicle speed is provided. [Solution] The present invention provides a gear shift output device which receives a continuously variable output in a first speed and a second speed by a planetary third element, input-side first to third transmission paths capable of transmitting driving source power to the planetary first or second element, and output-side first to third transmission paths capable of transmitting combined power from the planetary second or first element to the traveling output shaft. The first element serves as a reference power input section for inputting driving source power and the second element serves as a combined output section when a vehicle speed is a first gear in a range up to a first vehicle speed and a third gear in a rang equal to or larger than a second vehicle speed. The first element serves as the combined output section and the second element serves as the reference power input section when the vehicle speed corresponds to a second gear in a range between the first and second vehicle speeds. A rotation speed of the planetary second element is substantially the same between when an output of the gear shift output device corresponds to a second speed in the first gear and at a time of a second gear, and a rotation speed of the planetary first (Continued)

element is substantially the same between when an output of the gear shift output device corresponds to the second speed in the first gear and a time of a third gear.

11 Claims, 7 Drawing Sheets

(58) Field of Classification Search
CPC .......... F16H 37/0833; F16H 2037/048; F16H 2037/0886; F16H 39/00–47/12
See application file for complete search history.

TRANSMISSION STRUCTURE

CROSS REFERENCE TO RELATED APPLICATIONS

The present invention claims priority under 35 U.S.C. § 119 to Japanese Application No. 2023-193386, filed on Nov. 14, 2023, the entire contents of which being incorporated herein by reference.

TECHNICAL FIELD

The present invention relates to a transmission structure having a planetary gear mechanism that combines and outputs a rotation power supplied from a driving source and a rotation power supplied from a gear shift output device.

BACKGROUND ART

A hydromechanical continuously variable transmission (HMT) including a planetary gear mechanism for combining and outputting a rotation power supplied from a driving source and a rotation power supplied from the hydrostatic continuously variable transmission (HST) is suitably used in a traveling system transmission path of work vehicles, such as a combine harvester or a tractor, and various structures for enlarging a vehicle speed variable range have been proposed.

For example, Patent Document 1 below discloses a transmission structure in which a vehicle speed variable range is enlarged by connecting an HMT and a gear shift change device having three shift gears, that is, a low speed stage, a middle speed stage, and a high speed stage, to each other in series in terms of power transmission.

However, the transmission structure described in Patent Document 1 is intended to set one of the three speeds of the gear transmission device in advance before a vehicle starts traveling, that is, to perform a shift operation, and when the shift operation is performed on the planetary gear transmission device while a vehicle is traveling, the inconvenience occurs as below.

At this point, a case where a vehicle traveling speed is increased by operating the HMT in a state in which the gear transmission device is set to a low speed stage and the gear transmission device is shifted from the low speed stage to the middle speed stage at a time point when the vehicle traveling speed reaches a predetermined vehicle speed will be described as an example.

In this case, when an output of the HMT reaches a highest speed or an almost highest speed with the low speed state of the gear transmission device, the gear transmission device is shifted from the low speed stage to the middle speed state while the output of the HMT is maintained in the highest speed or the almost highest speed, and therefore, the vehicle speed considerably changes at a gear shifting operation. Accordingly, ride quality is deteriorated, and an excessive load is applied to the transmission structure.

On this point, the applicant of this application has proposed a transmission structure including an HST, a planetary gear mechanism which has first to third elements and receives an HST output by the third element, a traveling output shaft which is operatively driven by a planetary output section of the planetary gear mechanism, an input-side first transmission mechanism and an input-side second transmission mechanism which are capable of operatively transmitting rotation power of a driving source to the first element and the second element, respectively, of the planetary gear mechanism, an input-side first clutch mechanism and an input-side second clutch mechanism which engage or disengage power transmission of the input-side first transmission mechanism and the input-side second transmission mechanism, respectively, an output-side first transmission mechanism and an output-side second transmission mechanism which are capable of operatively transmitting rotation power of the second element and the first element, respectively, to the traveling output shaft, an output-side first clutch mechanism and an output-side second clutch mechanism which engage or disengage power transmission of the output-side first transmission mechanism and the output-side second transmission mechanism, respectively, an output-side third transmission mechanism, and an output-side third clutch mechanism which engages or disengages the output-side third transmission mechanism, a gear shift operation member, and a control device (refer to the eighth and ninth embodiments in Patent Document 2 below).

In a first gear transmission state in which a rotation speed of the traveling output shaft is smaller than a predetermined first vehicle speed X (refer to FIG. 7), the control device brings the input-side and output-side first clutch mechanisms into an engaged state and the input-side and output-side second clutch mechanisms into a disengaged state so that a first transmission state in which the first element functions as a planetary input section for inputting a reference power from the driving source and the second element functions as a planetary output section is entered. Here, an output adjusting member is operated so as to change an HST output from a first HST speed to a second HST speed in accordance with an acceleration operation performed by the gear shift operation member. In a second gear transmission state in which a rotation speed of the traveling output shaft is equal to or higher than the first vehicle speed X and lower than a predetermined second vehicle speed Y, the input-side and output-side first clutch mechanisms are brought into a disconnected state and the input-side and output-side second clutch mechanisms are brought into an engaged state so that a second transmission state in which the first element functions as a planetary output section and the second element functions as a planetary input section is entered. Here, the output adjusting member is operated so as to change an HST output from the second HST speed to the first HST speed in accordance with an acceleration operation performed by the gear shift operation member.

A gear ratio of the input-side first transmission mechanism (input-side first gear ratio) and a gear ratio of the input-side second transmission mechanism (input-side second gear ratio) are set such that a rotation speed of the second element by a rotation power transmitted through the input-side second transmission mechanism in the second transmission state is substantially the same as a rotation speed of the second element obtained when an HST output corresponds to the second HST speed in the first transmission state. Furthermore, a rotation speed of the first element by rotation power transmitted via the input-side first transmission mechanism in the first transmission state is set to be substantially the same as a rotation speed of the first element obtained when the HST output corresponds to the second HST speed in the second transmission state.

A gear ratio of the output-side first transmission mechanism (output-side first gear ratio) and a gear ratio of the output-side second transmission mechanism (output-side second gear ratio) are set so that substantially the same rotation speed is attained on a gear shift output shaft when the HST output is set to the second HST speed both in the first and second transmission states.

Furthermore, according to Patent Document 2, as illustrated in FIG. 7, when a rotation speed of the traveling output shaft reaches the second vehicle speed Y when the gear shift operation member is operated in an acceleration direction in the second transmission state, the control device brings the output-side second clutch mechanism from an engaged state to a disengaged state and the output-side third clutch mechanism from a disengaged state to an engaged state. At the same time, the output adjusting member is operated so that an output of the HST is changed from a rotation speed (first HST speed) for rotating the traveling output shaft at the second vehicle speed Y in the second transmission state to a rotation speed (third HST speed in FIG. 7) for rotating the traveling output shaft at a second switching speed Y or a speed close thereto in the third transmission state.

The transmission structure disclosed in Patent Document 2 is useful in that a gear shift width of the gear shift output shaft is enlarged without generating a dramatical change in rotation speed in the gear shift output shaft when compared with the transmission structure disclosed in Patent Document 1.

However, in terms of switching between the second gear transmission state and the third gear transmission state, switching between the second and third clutch mechanisms and speed adjustment between the second and third HST speeds of the HST (output adjusting member) are required to be simultaneously controlled, and therefore, the control is complicated and there is room for improvement.

PRIOR ART DOCUMENT

Patent Document

Patent Document 1: Japanese Patent No. 5822761
Patent Document 2: Japanese Unexamined Patent Application Publication No. 2020-152364

SUMMARY OF INVENTION

Technical Problem

The present invention is made in view of the related arts, and an object thereof is to provide a transmission structure which includes a gear shift output device which outputs continuously variable rotation power, a planetary gear mechanism, input-side first to third transmission paths capable of transmitting rotation power supplied from a driving source to the planetary gear mechanism, and output-side first to third transmission paths capable of transmitting combined rotation power output from the planetary gear mechanism to a traveling output shaft. The transmission structure is further capable of entering first to third gear transmission states by performing switching among the input-side first to third transmission paths and among the output-side first to third transmission paths. The transmission structure is capable of smoothly performing switching among the first to third gear transmission states.

Solution to Problem

In order to achieve the above object, a first aspect of the present invention provides a transmission structure configured as follows. Specifically, a transmission structure that continuously shifts rotation power of a driving shaft operatively coupled to a driving source and that transmits the rotation power to a traveling output shaft that outputs the rotation power to driving wheels, includes a gear shift output device that outputs gear shift rotation power which is continuously variable at least between a first speed and a second speed, a planetary gear mechanism that includes first to third elements and that inputs the gear shift rotation power to the third element, an input-side first transmission path that transmits rotation power of the driving shaft to the first element, an input-side second transmission path that transmits the rotation power of the driving shaft to the second element, an input-side third transmission path that transmits the rotation power of the driving shaft to the first element, input-side first to third clutch mechanisms that are inserted into the input-side first to third transmission paths, respectively, an output-side first transmission path that transmits rotation power of the second element to the traveling output shaft, an output-side second transmission path that transmits rotation power of the first element to the traveling output shaft, an output-side third transmission path that transmits the rotation power of the second element to the traveling output shaft, output-side first to third clutch mechanisms that are inserted into the output-side first to third transmission paths, respectively, a gear shift operation member, and a control device that operatively controls the gear shift output device, the input-side first to third clutch mechanisms, and the output-side first to third clutch mechanisms. The control device is configured as follows.

The control device enters, in a range in which an absolute value of a rotation speed of the traveling output shaft is within a first vehicle speed, a first gear transmission state by bringing the input-side and output-side first clutch mechanisms into an engaged state and bringing the other input-side clutch mechanisms and the other output-side clutch mechanisms into a disengaged state. In this case, when the gear shift operation member is operated to a vehicle stop position, an output of the gear shift output device is changed to a first speed so that a rotation speed of the second element becomes zero speed and an output of the gear shift output device is changed toward the second speed in response to an acceleration operation performed on the gear shift operation member so that the rotation speed of the second element is increased.

The control device enters, in a range in which the absolute value of the rotation speed of the traveling output shaft is from the first vehicle speed to a second vehicle speed, a second gear transmission state by bringing the input-side and output-side second clutch mechanisms into an engaged state and bringing the other input-side clutch mechanisms and the other output-side clutch mechanisms into a disengaged state. In this case, the rotation speed of the first element is increased by changing an output of the gear shift output device to the first speed in response to an acceleration operation performed on the gear shift operation member.

The control device enters, when the absolute value of the rotation speed of the traveling output shaft exceeds the second vehicle speed, a third gear transmission state by bringing the input-side and output-side third clutch mechanisms into an engaged state and bringing the other input-side clutch mechanisms and the other output-side clutch mechanisms into a disengaged state. In this case, the rotation speed of the second element is increased by changing an output of the gear shift output device to the second speed in response to an acceleration operation performed on the gear shift operation member.

The rotation speed of the second element in the second gear transmission state is substantially the same as the rotation speed of the second element attained when the output of the gear shift output device is the second speed in the first gear transmission state. Furthermore, the rotation speed of the second element attained when the output of the gear shift output device is the second speed in the second gear transmission state is substantially the same as the rotation speed of the first element in the first gear transmission state. Furthermore, the rotation speed of the first element in the third gear transmission state is substantially the same as the rotation speed of the first element attained when the output of the gear shift output device is the first speed in the second gear transmission state. Furthermore, the rotation speed of the second element attained when the output of the gear shift output device is the first speed in the third gear transmission state is substantially the same as the rotation speed of the second element in the second gear transmission state.

The transmission structure according to the first aspect may further include a first transmission shaft operatively coupled to the first element, a second transmission shaft operatively coupled to the second element, input-side first and third driving gears supported by the driving shaft in a relative rotation available manner while being operatively coupled to the first transmission shaft, and an input-side second driving gear supported by the driving shaft in a relative rotation available manner while being operatively coupled to the second transmission shaft.

The input-side first to third clutch mechanisms may engage and disengage power transmission from the driving shaft to the input-side first to third driving gears. The second transmission shaft may be disposed coaxially with the planetary gear mechanism. The first transmission shaft is externally inserted to the second transmission shaft in a relative rotation available manner.

A second aspect of the present invention provides a transmission structure configured as follows. Specifically, a transmission structure that continuously shifts rotation power of a driving shaft operatively coupled to a driving source and that transmits the rotation power to a traveling output shaft that outputs the rotation power to driving wheels, includes a gear shift output device that outputs gear shift rotation power which is continuously variable at least between a first speed and a second speed, a planetary gear mechanism that includes first to third elements and that inputs the gear shift rotation power to the third element, an input shaft, an input-side first transmission path operatively coupled to the first element, an input-side second transmission path that transmits the rotation power of the driving shaft to the second element, an input-side third transmission path operatively coupled to the first element, an input shaft clutch mechanism that engages and disengages power transmission from the driving shaft to the input shaft, a shifter that operatively couples the input shaft to the input-side first and third transmission paths in a selectable manner, an input-side second clutch mechanism that is inserted to the input-side second transmission path, an output-side first transmission path that transmits rotation power of the second element to the traveling output shaft, an output-side second transmission path that transmits rotation power of the first element to the traveling output shaft, an output-side third transmission path that transmits the rotation power of the second element to the traveling output shaft, output-side first to third clutch mechanisms that are inserted into the output-side first to third transmission paths, respectively, a gear shift operation member, and a control device that operatively controls the gear shift output device, the input-side first to third clutch mechanisms, and the output-side first to third clutch mechanisms. The control device is configured as follows.

The control device enters, in a range in which an absolute value of a rotation speed of the traveling output shaft is within a first vehicle speed, a first gear transmission state by bringing the input shaft clutch mechanism and the output-side first clutch mechanism into an engaged state and bringing the other clutch mechanisms into a disengaged state while the input shaft is operatively coupled to the input-side first transmission path by the shifter. In this case, when the gear shift operation member is operated to a vehicle stop position, an output of the gear shift output device is changed to a first speed so that a rotation speed of the second element becomes zero speed and an output of the gear shift output device is changed toward the second speed in response to an acceleration operation performed on the gear shift operation member so that the rotation speed of the second element is increased. The control device enters, in a range in which the absolute value of the rotation speed of the traveling output shaft is from the first vehicle speed to a second vehicle speed, a second gear transmission state by bringing the input-side and output-side second clutch mechanisms into an engaged state and bringing the other clutch mechanisms into a disengaged state. In this case, the rotation speed of the first element is increased by changing an output of the gear shift output device to the first speed in response to an acceleration operation performed on the gear shift operation member.

The control device enters, when the absolute value of the rotation speed of the traveling output shaft exceeds the second vehicle speed, a third gear transmission state by bringing the input shaft clutch mechanism and the output-side third clutch mechanism into an engaged state and bringing the other clutch mechanisms into a disengaged state while the input shaft is operatively coupled to the input-side third transmission path by the shifter. In this case, the rotation speed of the second element is increased by changing an output of the gear shift output device to the second speed in response to an acceleration operation performed on the gear shift operation member.

The rotation speed of the second element in the second gear transmission state is substantially the same as the rotation speed of the second element attained when an output of the gear shift output device is the second speed in the first gear transmission state. Furthermore, the rotation speed of the first element attained when the output of the gear shift output device is the second speed in the second gear transmission state is substantially the same as the rotation speed of the first element in the first gear transmission state. Furthermore, the rotation speed of the first element in the third gear transmission state is substantially the same as the rotation speed of the first element attained when the output of the gear shift output device is the first speed in the second gear transmission state. Furthermore, the rotation speed of the second element attained when the output of the gear shift output device is the first speed in the third gear transmission state is substantially the same as the rotation speed of the second element in the second gear transmission state.

The control device according to a mode of a second aspect is configured as follows. The control device causes the shifter to couple the input shaft to the input-side third transmission path in advance so that a third gear preparation state is entered at a time when a rotation speed of the traveling output shaft reaches a shift-up preparation speed which is lower by a predetermined speed than the second vehicle speed when the second gear transmission state is shifted up to the third gear transmission state. Furthermore, the control device causes the shifter to couple the input shaft to the input-side first transmission path in advance so that a first gear preparation state is entered at a time when a rotation speed of the traveling output shaft reaches a shift-down preparation speed which is higher by a predetermined speed than the first vehicle speed when the second gear transmission state is shifted down to the first gear transmission state.

The control device according to another mode of a second aspect is configured as follows. The control device causes the shifter to couple the input shaft to the input-side third transmission path so that a third gear preparation state is entered when a rotation speed of the traveling output shaft is increased in the second gear transmission state. The control device causes the shifter to couple the input shaft to the input-side third transmission path so that a first gear preparation state is entered when a rotation speed of the traveling output shaft is lowered in the second gear transmission state.

The transmission structure according to the second aspect includes a first transmission shaft operatively coupled to the first element, a second transmission shaft operatively coupled to the second element, input-side first and third driving gears supported by the input shaft in a relative rotation available manner while being operatively coupled to the first transmission shaft, and an input-side second driving gear supported by the driving shaft in a relative rotation available manner while being operatively coupled to the second transmission shaft.

The shifter may couple the input shaft to the input-side first and third driving gears in a selectable manner. The input-side second clutch mechanism may engage and disengage power transmission from the driving shaft to the input-side second driving gear. The second transmission shaft may be disposed coaxially with the planetary gear mechanism. The first transmission shaft is externally inserted to the second transmission shaft in a relative rotation available manner.

The transmission structure according to the present invention may further include input-side first and third driven gears that are supported by the first transmission shaft in a relative rotation unavailable manner and that are operatively coupled to the input-side first and third driving gears, respectively, and an input-side second driven gear that is supported by the second transmission shaft in a relative rotation unavailable manner and that is operatively coupled to the input-side second driving gear.

In this case, the input-side first transmission path includes the input-side first driving gear, the input-side first driven gear, and the first transmission shaft, the input-side second transmission path includes the input-side second driving gear, the input-side second driven gear, and the second transmission shaft, and the input-side third transmission path includes the input-side third driving gear, the input-side third driven gear, and the first transmission shaft.

The transmission structure according to the present invention may further include an intermediate shaft disposed between the first and second transmission shafts and the traveling output shaft in a transmission direction, an output-side first gear supported by the intermediate shaft in a relative rotation available manner while being operatively coupled to the second transmission shaft, an output-side second gear supported by the intermediate shaft in a relative rotation available manner while being operatively coupled to the first transmission shaft, and an output-side third gear supported by the traveling output shaft in a relative rotation available manner while being operatively coupled to the second transmission shaft.

In this case, the output-side first and second clutch mechanisms may engage and disengage power transmission from the output-side first and second gears to the intermediate shaft, respectively.

The output-side third clutch mechanism may engage and disengage power transmission from the output-side third gear to the traveling output shaft.

The output-side first gear may be operatively coupled to the second transmission shaft through the input-side second driven gear, the output-side second gear may be operatively coupled to the first transmission shaft through the input-side first driven gear, and the output-side third gear may be operatively coupled to the second transmission shaft through the output-side first gear.

The transmission structure according to the present invention may further include an output-side intermediate gear coupled to the output-side first gear in a relative rotation unavailable manner while being supported by the intermediate shaft in a relative rotation available manner. The output-side third gear is operatively coupled to the output-side intermediate gear.

The transmission structure according to the present invention may further include a forward transmission mechanism and a reverse transmission mechanism that are capable of operatively transmitting rotation power of the intermediate shaft to the traveling output shaft as forward rotation power and reverse rotation power, and a forward clutch mechanism and a reverse clutch mechanism that engage and disengage power transmission of the forward transmission mechanism and the reverse transmission mechanism, respectively.

In this case, the forward transmission mechanism and the reverse transmission mechanism constitute a portion of the output-side first transmission path and a portion of the output-side second transmission path, respectively.

Advantageous Effects of Invention

According to the transmission structure of the present invention, the switching among the first to third gear transmission states realized by switching among the input-side first to third transmission paths and the output-side first to third transmission paths is smoothly performed, and in the first to third transmission state, and furthermore, in the first to third gear transmission states, the gear shift output device of the transmission structure performs an output change operation such that reciprocation between the first and second speeds is performed in accordance with one of the first to third gear transmission states, that is, a shift from the first speed to the second speed in the first gear transmission state, a shift from the second speed to the first speed in the second gear transmission state, and a shift from the first speed to the second speed in the third gear transmission state, and accordingly, the control is simplified.

DESCRIPTION OF EMBODIMENTS

First Embodiment

Hereinafter, an embodiment of a transmission structure according to the present invention will be described with reference to the accompanying drawings.

Figure 1:
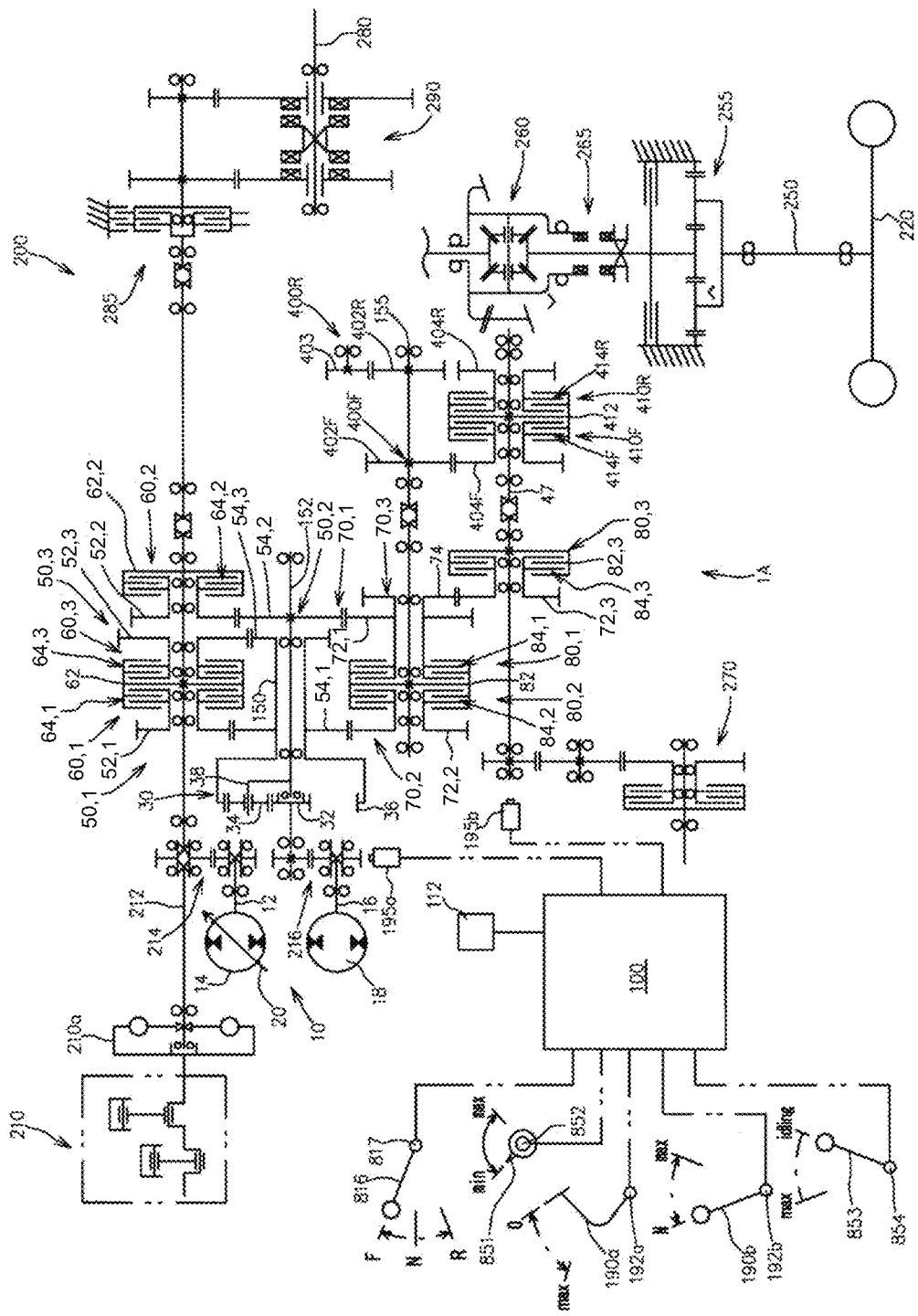
FIG. 1 is a diagram schematically illustrating power transmission of a work vehicle to which a transmission structure according to a first embodiment of the present invention is applied.

FIG. 1 is a diagram schematically illustrating power transmission in a work vehicle 200 to which a transmission structure 1A according to this embodiment is applied.

Figure 2:
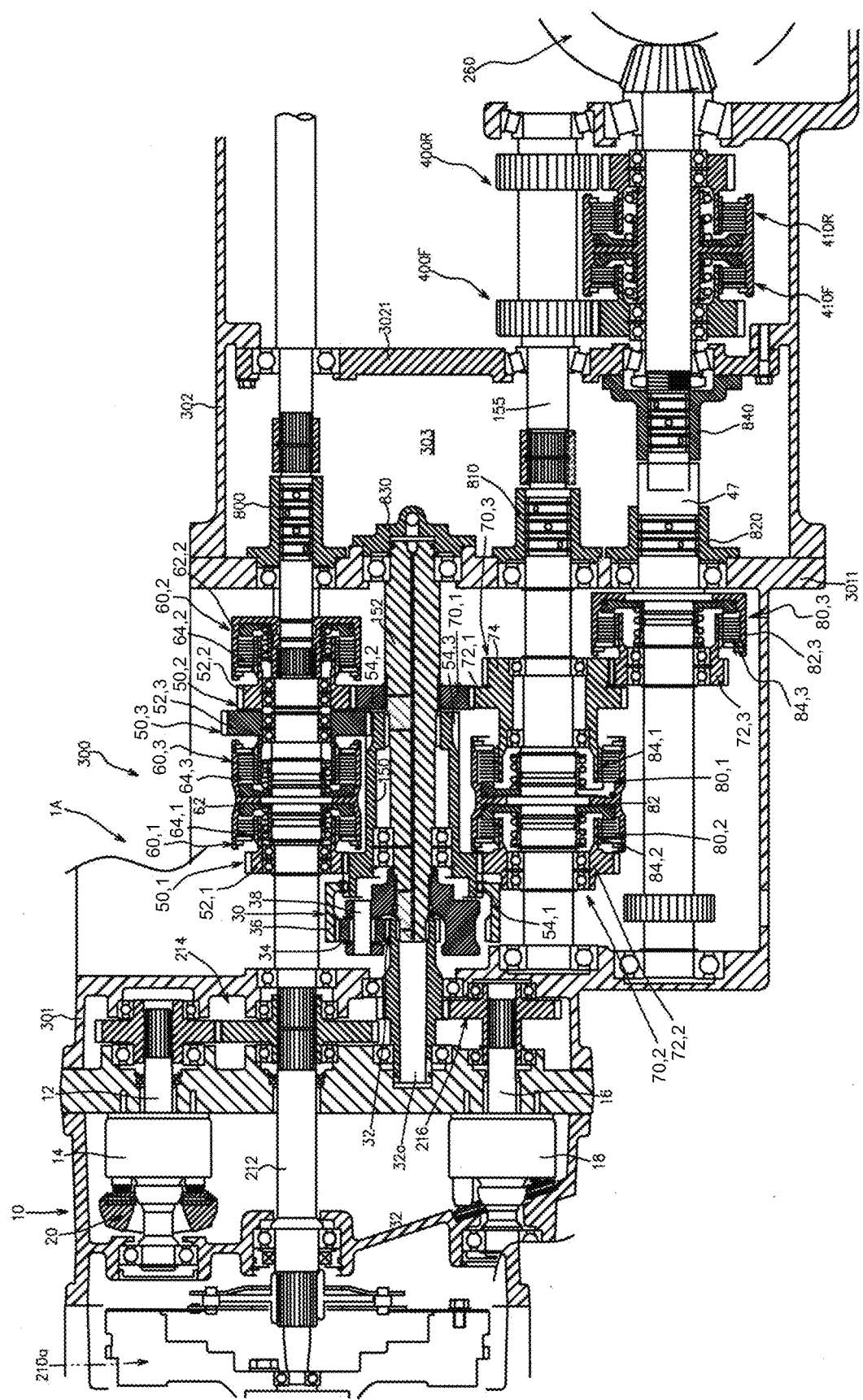
FIG. 2 is a vertical cross sectional side view of the transmission structure according to the first embodiment.

FIG. 2 is a vertical cross sectional side view of the transmission structure 1A.

As illustrated in FIG. 1, the work vehicle 200 includes a driving source 210, a driving shaft 212 operatively coupled to the driving source 210, driving wheels 220, a traveling output shaft 47 which outputs rotation power to the driving wheels 220, and the transmission structure 1A which transmits the rotation power from the driving shaft 212 to the traveling output shaft 47.

Note that a reference numeral 210*a* in FIGS. 1 and 2 indicates a flywheel included in the driving source 210.

The work vehicle 200 has a pair of right and left main driving wheels as the driving wheels 220.

Accordingly, as illustrated in FIG. 1, the work vehicle 200 further includes a pair of main driving shafts 250 that drive the pair of main driving wheels 220, respectively, and a differential mechanism 260 that differentially transmits the rotation power of the traveling output shaft to the pair of main driving shafts 250.

As illustrated in FIG. 1, the work vehicle 200 further includes a traveling brake mechanism 255 that selectively applies a braking force to the main driving shafts 250, a differential lock mechanism 265 that forcibly drives the pair of main driving shafts 250 in a synchronized manner using rotation power supplied from the traveling output shaft 47, and a driving force takeout mechanism 270 for subsidiary driving wheels which is capable of selectively outputting the rotation power taken out from the traveling output shaft 47 to the subsidiary driving wheels.

Furthermore, the work vehicle 200 includes a PTO shaft 280 that outputs rotation power to the outside, and a PTO clutch mechanism 285 and a PTO multistage gear shift mechanism 290 that are interposed in a PTO transmission path extending from the driving source 210 to the PTO shaft 280.

The transmission structure 1A includes a gear shift output device, a planetary gear mechanism 30, input-side first to third transmission paths 50(1) to 50(3), input-side first to third clutch mechanisms 60(1) to 60(3), output-side first to third transmission paths 70(1) to 70(3), output-side first to third clutch mechanisms 80(1) to 80(3), a gear shift operation member, and a control device 100.

The gear shift output device outputs gear shift rotation power which is continuously variable at least between a first speed and a second speed. The gear shift output device is subjected to operation control performed by the control device 100.

As illustrated in FIGS. 1 and 2, the transmission structure 1A of this embodiment includes a hydrostatic continuously variable transmission mechanism (HST) 10 as the gear shift output device.

The HST 10 forms an HMT (hydromechanical continuously variable transmission structure) in cooperation with the planetary gear mechanism 30. Note that two electric motors which are capable of outputting continuously variable rotation by a manual operation may be disposed in the transmission structure 1A as the gear shift output device instead of the HST 10. One of the electric motors drives one of the three planetary elements constituting the planetary gear mechanism 30 at a constant speed, and the other electric motor is configured to be switchable between forward rotation and reverse rotation and drives the other elements of the three planetary elements at a variable speed.

As illustrated in FIGS. 1 and 2, the HST 10 includes a pump shaft 12 that is operatively driven in a rotatable manner by the driving source 210, an HST pump 14 that is supported by the pump shaft 12 in a relative rotation unavailable manner, an HST motor 18 that is fluidly connected to the HST pump 14 via a closed circuit (a pair of first and second HST lines) so as to be hydraulically driven in a rotatable manner by the HST pump 14, a motor shaft 16 that supports the HST motor 18 in a relative rotation unavailable manner, and an output adjusting member 20 that changes an inner volume of at least one of the HST pump 14 and the HST motor 18.

The HST 10 may continuously vary a ratio of a rotation speed of the HST output, which is output from the motor shaft 16, to a rotation speed of power input to the pump shaft 12 (that is, a gear ratio of the HST 10) in accordance with an operating position of the output adjusting member 20.

Specifically, when a rotation speed of rotation power operationally input from the driving source 210 to the pump shaft 12 is determined as a reference input speed, the HST 10 performs continuously variable transmission on the reference input speed to obtain at least rotation power in a range from the first speed to the second speed in accordance with an operating position of the output adjusting member 20.

Note that a reference numeral 195*a* in FIG. 1 is a gear shift output sensor that detects an output rotation speed of the gear shift output device (HST 10 in this embodiment).

Note that, in this embodiment, as illustrated in FIGS. 1 and 2, the pump shaft 12 is coupled via an HST input gear train 214 to the driving shaft 212 which is operatively coupled to the driving source 210.

Figure 4:
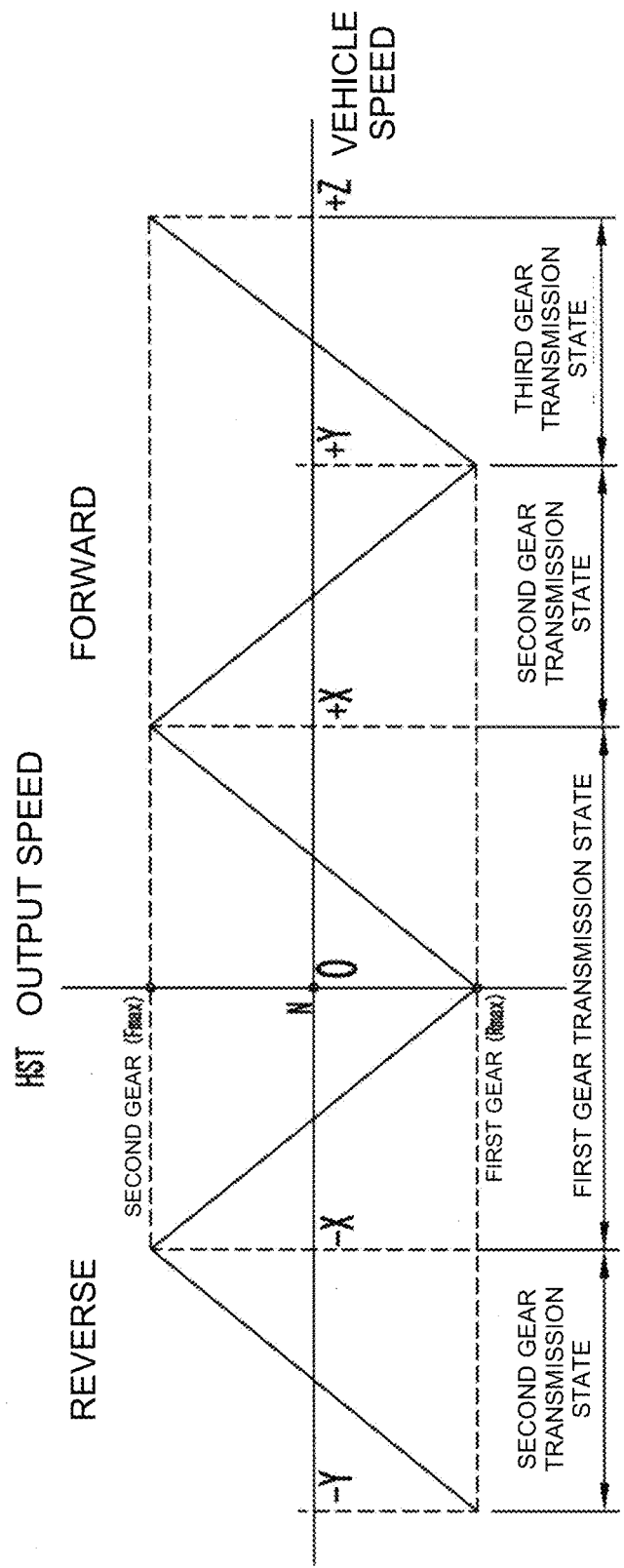
FIG. 4 is a graph illustrating the relationship between an output rotation speed of a gear shift output device (HST) in the transmission structure according to the first embodiment and an output rotation speed (vehicle speed) of the transmission structure.

FIG. 4 is a graph of the relationship between the output rotation speed of the HST 10 and a rotation speed (vehicle speed) of a driving rotation power of the transmission structure 1A.

As illustrated in FIG. 4, in this embodiment, the HST 10 is capable of switching a rotational direction of an HST output between forward and reverse directions.

That is, assuming that a rotational direction of the reference input speed is a forward direction, the HST 10 outputs rotational power of the first speed (for example, highest speed Rmax in reverse direction) whose rotational direction is one of the forward and reverse directions (for example, reverse direction) from the motor shaft 16 when the output adjusting member 20 is positioned at a first operating position, and outputs rotational power of the second speed (for example, highest speed Fmax in forward direction) whose rotational direction is the other of the forward and reverse directions (for example, forward direction) from the motor shaft 16 when the output adjusting member 20 is positioned at a second operating position.

In this case, when the output adjusting member 20 is positioned at a neutral position between the first and second operating positions, a rotation speed of the HST output becomes a neutral speed (zero speed).

In this embodiment, as the output adjusting member 20, the HST 10 has a movable swash plate, commonly known as an axial piston pump, that changes the inner volume of the HST pump 14 by being swung about a swing shaft and can swing to one side and the other side about the swing shaft with the neutral position placed therebetween where an amount of discharge from the HST pump 14 is set to zero (refer to FIG. 2).

When the movable swash plate is positioned in the neutral position, pressurized oil is not discharged from the HST pump 14, and thus the HST 10 is brought into a neutral state where an output of the HST motor 18 is zero.

Thereafter, when the movable swash plate is swung from the neutral position to a forward rotation side about the swing shaft, the pressurized oil is supplied from the HST pump 14 to one of the pair of HST lines which constitutes the closed circuit, and thus the one of the HST lines, i.e., a first HST line, is brought to a high pressure side and the other of the HST lines, i.e., a second HST line, is brought to a low pressure side.

Accordingly, the HST motor 18 is driven in a rotatable manner to the forward rotation side, and thus the HST 10 is brought into a forward rotation output state.

Conversely, when the movable swash plate is swung from the neutral position to the reverse side that is the other side about the swing shaft, the pressurized oil is supplied from the HST pump 14 to the other of the pair of HST lines, i.e., the second HST line, and thus the other of the HST lines, i.e., the second HST line, is brought to a high pressure side, and the one of the HST lines, i.e., the first HST line 15*a*, is brought to a low pressure side.

Accordingly, the HST motor 18 is driven in a rotatable manner to the reverse rotation side, and thus the HST 10 is brought into a reverse rotation output state.

Note that, in the HST 10, an inner volume of the HST motor 18 is fixed by a fixed swash plate.

The output adjusting member 20 is operatively controlled by the control device 100 in accordance with an operation of the gear shift operation member.

Specifically, the transmission structure 1 according to this embodiment includes an HST gear shift actuator that operates the output adjusting member 20, and the control device 100 actuates the output adjusting member 20 through the HST gear shift actuator in accordance with an operation of the gear shift operation member.

The HST gear shift actuator may employ various configurations, such as an electric motor and a hydraulic mechanism (hydraulic servo mechanism, for example), as long as an operation control can be performed by the control device 100. In this embodiment, the hydraulic mechanism is employed, and an electromagnetic valve and the like included in the hydraulic mechanism are accommodated in a valve block indicated by a reference numeral 112 in FIG. 1.

Note that the transmission structure 1A according to this embodiment includes an accelerator pedal 190*a* and a main gear shift lever 190*b* as the gear shift operation members as illustrated in FIG. 1. Reference numerals 192*a* and 192*b* in FIG. 1 denote sensors for detecting operating positions of the accelerator pedal 190*a* and the main gear shift lever 190*b*, respectively.

As illustrated in FIGS. 1 and 2, the planetary gear mechanism 30 includes a sun gear 32, a planetary gear 34 that meshes with the sun gear 32, an internal gear 36 that meshes with the planetary gear 34, and a carrier 38 that supports the planetary gear 34 in a rotatable manner about an axial line and rotates about an axial line of the sun gear 32 in conjunction with revolution of the planetary gear 34 around the sun gear 32. The sun gear 32, the carrier 38, and the internal gear 36 are three main elements for power transmission of the planetary gear mechanism 30.

A third element included in the three planetary elements functions as a variable power inputter that inputs gear shift rotation power. In this embodiment, the sun gear 32 is the third element.

As described above, according to this embodiment, the HST 10 is provided as the gear shift output device, and therefore, the third element (sun gear 32) is operatively coupled to the motor shaft 16.

Note that, in this embodiment, the sun gear 32 is operatively coupled to the motor shaft 16 via an HST output gear train 216.

The input-side first and third transmission paths 50(1) and 50(3) transmit rotation power of the driving shaft 212 to the first element, and the input-side second transmission path 50(2) transmits rotation power of the driving shaft 212 to the second element.

In this embodiment, the internal gear 36 and the carrier 38 function as the first and second elements, respectively.

As illustrated in FIGS. 1 and 2, the transmission structure 1A according to this embodiment includes a first transmission shaft 150 operatively coupled to the first element (internal gear 36), a second transmission shaft 152 operatively coupled to the second element (carrier), input-side first and third driving gears 52(1) and 52(3) supported by the driving shaft 212 in a relatively rotatable manner while being operatively coupled to the first transmission shaft 150, and an input-side second driving gear 52(2) supported by the driving shaft 212 in a relatively rotatable manner while being operatively coupled to the second transmission shaft 152.

With this configuration, the input-side first driving gear 52(1) and the first transmission shaft 150 form the input-side first transmission path 50(1), the input-side second driving gear 52(2) and the second transmission shaft 152 form the input-side second transmission path 50(2), and the input-side third driving gear 52(3) and the first transmission shaft 150 form the input-side third transmission path 50(3).

In this embodiment, as illustrated in FIGS. 1 and 2, the second transmission shaft 152 is disposed coaxially with the planetary gear mechanism 30, and the first transmission shaft 150 is externally inserted to the second transmission shaft 152 in a relatively rotatable manner.

Note that, as illustrated in FIGS. 1 and 2, the transmission structure 1A according to this embodiment further includes input-side first and third driven gears 54(1) and 54(3) that are supported by the first transmission shaft 150 in a relative rotation unavailable manner and that are operatively coupled to the first and third driving gears 52(1) and 52(3), respectively, and an input-side second driven gear 54(2) that is supported by the second transmission shaft 152 in a relative rotation unavailable manner and that is operatively coupled to the input-side second driving gear 52(2).

The input-side first to third driven gears 54(1) to 54(3) form portions of the input-side first to third transmission paths 50(1) to 50(3), respectively.

The input-side first to third clutch mechanisms 60(1) to 60(3) are inserted into the input-side first to third transmission paths 50(1) to 50(3), respectively.

As illustrated in FIGS. 1 and 2, in this embodiment, the input-side first to third clutch mechanism 60(1) to 60(3) engages and disengages power transmission from the driving shaft 212 to the input-side first to third driving gears 52(1) to 52(3), respectively.

In this embodiment, the input-side first to third clutch mechanisms 60(1) to 60(3) are hydraulic multiple plate clutches.

The input-side first and third clutch mechanisms 60(1) and 60(3) have a common clutch housing supported by the driving shaft 212 in a relative rotation unavailable manner.

Specifically, the input-side first clutch mechanism 60(1) includes an input-side common clutch housing 62, an input-side first friction plate group 64(1) that includes a first driving-side friction plate supported by the input-side common clutch housing 62 in a relative rotation unavailable manner and a first driven-side friction plate supported by the input-side first driving gear 52(1) in a relative rotation unavailable manner while facing the first driving-side friction plate, and an input-side first piston (not illustrated) that frictionally engages the input-side first friction plate group 64(1).

The input-side third clutch mechanism 60(3) includes the input-side common clutch housing 62, an input-side third friction plate group 64(3) that includes a third driving-side friction plate supported by the input-side common clutch housing 62 in a relative rotation unavailable manner and a third driven-side friction plate supported by the input-side third driving gear 52(3) in a relative rotation unavailable manner while facing the third driving-side friction plate, and an input-side third piston (not illustrated) that frictionally engages the input-side third friction plate group 64(3).

The input-side second clutch mechanism 60(2) includes an input-side second clutch housing 62(2) supported by the driving shaft 212 in a relative rotation unavailable manner, an input-side second friction plate group 64(2) that includes a second driving-side friction plate supported by the input-side second clutch housing 62(2) in a relative rotation unavailable manner and a second driven-side friction plate supported by the input-side second driving gear 52(2) in a relative rotation unavailable manner while facing the second driving-side friction plate, and an input-side second piston (not illustrated) that frictionally engages the input-side second friction plate group 64(2).

The output-side first and third transmission paths 70(1) and 70(3) transmit rotation power of the second element to the traveling output shaft 47, and the output-side second transmission path 70(2) transmits rotation power of the first element to the traveling output shaft 47.

As illustrated in FIGS. 1 and 2, the transmission structure 1A of this embodiment includes an intermediate shaft 155 disposed between the first and second transmission shafts 150 and 152 and the traveling output shaft 47 in a transmission direction, an output-side first gear 72(1) supported by the intermediate shaft 155 in a relative rotation available manner while being operatively coupled to the second transmission shaft 152, an output-side second gear 72(2) supported by the intermediate shaft 155 in a relative rotation available manner while being operatively coupled to the first transmission shaft 150, and an output-side third gear 72(3) supported by the traveling output shaft 47 in a relative rotation available manner while being operatively coupled to the second transmission shaft 152.

In this configuration, the second transmission shaft 152, the output-side first gear 72(1), and the intermediate shaft 155 form a portion of the output-side first transmission path 70(1), the first transmission shaft 150, the output-side second gear 72(2), and the intermediate shaft 155 form a portion of the output-side second path 70(2), and the second transmission shaft 152 and the output-side third gear 72(3) form a portion of the output-side third path 70(3).

As illustrated in FIGS. 1 and 2, the output-side first gear 72(1) is operatively coupled to the second transmission shaft 152 through the input-side second driven gear 54(2).

Specifically, in this embodiment, the input-side second driven gear 54(2) forms a portion of the input-side second transmission path 50(2) while forming a portion of the output-side first transmission path 70(1).

Furthermore, the output-side second gear 72(2) is operatively coupled to the first transmission shaft 150 through the input-side first driven gear 54(1). Specifically, in this embodiment, the input-side first driven gear 54(1) forms a portion of the input-side first transmission path 50(1) while forming a portion of the output-side second transmission path 70(2).

Moreover, the output-side third gear 72(3) is operatively coupled to the second transmission shaft 152 through the output-side first gear 72(1). Specifically, in this embodiment, the input-side second driven gear 54(2) and the output-side first driven gear 72(1) also form a portion of the output-side third transmission path 70(3).

More specifically, the transmission structure 1A of this embodiment includes an output-side intermediate gear 74 coupled to the output-side first gear 72(1) in a relative rotation unavailable manner while being supported by the intermediate shaft 155 in a relative rotation available manner, and the output-side third gear 72(3) is operatively coupled to the output-side intermediate gear 74.

The output-side first to third clutch mechanisms 80(1) to 80(3) are inserted into the output-side first to third transmission paths, respectively.

As illustrated in FIGS. 1 and 2, in this embodiment, the output-side first and second clutch mechanisms 80(1) and 80(2) connect and disconnect power transmission from the output-side first and second gears 72(1) and 72(2) to the intermediate shaft 155, respectively.

In this embodiment, the output-side first and second clutch mechanisms 80(1) and 80(2) are hydraulic multiple plate clutches.

The output-side first and second clutch mechanisms 80(1) and 80(2) have a common clutch housing supported by the intermediate shaft 155 in a relative rotation unavailable manner.

Specifically, the output-side first clutch mechanism 80(1) includes an output-side common clutch housing 82 supported by the intermediate shaft 155 in a relative rotation unavailable manner, an output-side first friction plate group 84(1) that includes a first driving-side friction plate supported by the output-side common clutch housing 82 in a relative rotation unavailable manner and a first driven-side friction plate supported by the output-side first gear 72(1) in a relative rotation unavailable manner while facing the first driving-side friction plate, and an output-side first piston (not illustrated) that frictionally engages the output-side first friction plate group 84(1).

The output-side second clutch mechanism 80(2) includes the output-side common clutch housing 82, an output-side second friction plate group 84(2) that includes a second driving-side friction plate supported by the output-side common clutch housing 82 in a relative rotation unavailable manner and a second driven-side friction plate supported by the output-side second gear 72(2) in a relative rotation unavailable manner while facing the second driving-side friction plate, and an output-side second piston (not illustrated) that frictionally engages the output-side second friction plate group 84(2).

As illustrated in FIGS. 1 and 2, the output-side third clutch mechanism 80(3) connects and disconnects power transmission from the output-side third gear 72(3) to the traveling output shaft 47.

In this embodiment, the output-side third clutch mechanism 80(3) is a hydraulic multiple plate clutch.

Specifically, the output-side third clutch mechanism 80(3) includes an output-side third clutch housing 82(3) supported by the traveling output shaft 47 in a relative rotation unavailable manner, an output-side third friction plate group 84(3) that includes a third driving-side friction plate supported by the output-side third clutch housing 82(3) in a relative rotation unavailable manner and a third driven-side friction plate supported by the output-side third gear 72(3) in a relative rotation unavailable manner while facing the third driving-side friction plate, and an output-side third piston (not illustrated) that frictionally engages the output-side third friction plate group 84(3).

The transmission structure 1A further includes a transmission state switching actuator for switching engaging and disengaging of the input-side first to third clutch mechanisms 60(1) to 60(3) and the output-side first to third clutch mechanisms 80(1) to 80(3).

The transmission state switching actuator may employ various configurations, such as an electric motor and a hydraulic mechanism, as long as the operation control can be performed by the control device 100. When each of the clutch mechanisms 60(1) to 60(3) and 80(1) to 80(3) employs the hydraulic multiple plate clutch as described above, the transmission state switching actuator preferably includes a hydraulic mechanism. In this case, an electromagnetic valve and the like included in the hydraulic mechanism may be accommodated in the valve block 112.

As illustrated in FIGS. 1 and 2, the transmission structure 1A of this embodiment further includes a forward transmission mechanism 400F and a reverse transmission mechanism 400R that are capable of operatively transmitting rotation power of the intermediate shaft 155 to the traveling output shaft 47 as forward rotation power and reverse rotation power, respectively, and a forward clutch mechanism 410F and a reverse clutch mechanism 410R that connects and disconnects power transmission of the forward transmission mechanism 400F and the reverse transmission mechanism 400R, respectively.

With this configuration of this embodiment, the forward transmission mechanism 400F and the reverse transmission mechanism 400R form a portion of the output-side first transmission path 70(1) and a portion of the output-side second transmission path 70(2), respectively.

As illustrated in FIGS. 1 and 2, the forward transmission mechanism 400F has a forward-side gear train including a forward-side driven gear 404F meshed with the forward-side driving gear 402F in a state in which the forward transmission mechanism 400F is supported by the forward-side driving gear 402F supported by the intermediate shaft 155 and the traveling output shaft 47.

In this embodiment, the forward-side driving gear 402F is supported by the intermediate shaft 155 in a relative rotation unavailable manner, and the forward-side driven gear 404F is supported by the traveling output shaft 47 in a relative rotation available manner.

The reverse transmission mechanism 400R has a reverse-side gear train including a reverse-side driven gear 404R meshed with the reverse-side driving gear 402R via an idle gear 403 (refer to FIG. 1) in a state in which the reverse transmission mechanism 400R is supported by the traveling output shaft 47 and the reverse-side driving gear 402R supported by the intermediate shaft 155.

In this embodiment, the reverse-side driving gear 402R is supported by the intermediate shaft 155 in a relative rotation unavailable manner, and the reverse-side driven gear 404R is supported by the traveling output shaft 47 in a relative rotation available manner.

In this embodiment, the forward clutch mechanism 410F and the reverse clutch mechanism 410R are supported by the traveling output shaft 47 so as to engage and disengage the forward-side driven gear 404F and the reverse-side driven gear 404R with and from the traveling output shaft 47, respectively.

In this embodiment, the forward and reverse clutch mechanisms 410F and 410R are hydraulic multiple plate clutches.

The forward and reverse clutch mechanisms 410F and 410R have a common clutch housing supported by the traveling output shaft 47 in a relative rotation unavailable manner.

In detail, the forward clutch mechanism 410F includes a forward-reverse clutch housing 412 supported by the traveling output shaft 47 in a relative rotation unavailable manner, a forward-side friction plate group 414F that includes a forward driven-side friction plate supported by the forward-reverse clutch housing 412 in a relative rotation unavailable manner and a forward driving-side friction plate supported by the forward-side driven gear 404F in a relative rotation unavailable manner while facing the forward driven-side friction plate, and a forward-side piston (not illustrated) that frictionally engages the forward-side friction plate group 414F.

The reverse clutch mechanism 410R includes the forward-reverse clutch housing 412, a reverse-side friction plate group 414R that includes a reverse driven-side friction plate supported by the forward-reverse clutch housing 412 in a relative rotation unavailable manner and a reverse driving-side friction plate supported by the reverse-side driven gear 404R in a relative rotation unavailable manner while facing the reverse driven-side friction plate, and a reverse-side piston (not illustrated) that frictionally engages the reverse-side friction plate group 414R.

The control device 100 performs operation control of the gear shift output device (HST 10 in this embodiment), the input-side first to third clutch mechanisms 60(1) to 60(3), and the output-side first to third clutch mechanisms 80(1) to 80(3).

In this embodiment, the control device 100 further performs operation control of the forward and reverse clutch mechanisms 410F and 410R.

As illustrated in FIG. 1, the transmission structure 1A includes a forward-reverse switching operation member 816 which is manually operable and a forward-reverse actuator (not illustrated) that activates the forward clutch mechanism 410F and the reverse clutch mechanism 410R. The control device 100 activates the forward-reverse actuator so that the forward clutch mechanism 410F and the reverse clutch mechanism 410R enter respective transmission states corresponding to an operation performed on the forward-reverse switching operation member 816.

Note that a reference numeral 817 in FIG. 1 denotes a sensor that detects an operating position of the forward-reverse switching operation member 816.

The forward-reverse actuator may employ various configurations, such as an electric motor and a hydraulic mechanism, as long as the operation control can be performed by the control device 100.

When each of the forward clutch mechanisms 410F and the reverse clutch mechanism 410R employs the hydraulic multiple plate clutch as described above, the forward-reverse actuator preferably includes a hydraulic mechanism. In this case, an electromagnetic valve and the like included in the hydraulic mechanism may be accommodated in the valve block 112.

In response to an operation of the forward-reverse switching operation member 816 to a forward side F, the control device 100 activates the forward-reverse actuator so that the forward clutch mechanism 410F is brought into an engaged state and the reverse clutch mechanism 410R is brought into a disengaged state. In response to the operation of the forward-reverse switching operation member 816 to a reverse side R, the control device 100 activates the forward-reverse actuator so that the forward clutch mechanism 410F is brought into a disengaged state and the reverse clutch mechanism 410R is brought into an engaged state. In response to an operation of the forward-reverse switching operation member 816 to a neutral position N, the control device 100 activates the forward-reverse actuator so that both the forward and reverse clutch mechanisms 410F and 410R are brought into a disengaged state.

Here, a gear ratio of the input-side first to third transmission paths 50(1) to 50(3), the planetary gear mechanism 30, and the output-side first to third transmission paths 70(1) to 70(3) is described as below.

In the first gear transmission state that appears when the input-side first clutch mechanism 60(1) and the output-side first clutch mechanism 80(1) are brought into an engaged state and the remaining input-side clutch mechanisms (input-side second and third clutch mechanisms 60(2) and 60(3)) and the remaining output-side clutch mechanisms (output-side second and third clutch mechanisms 80(2) and 80(3)) are brought into a disengaged state, rotation power of the driving shaft 212 is transmitted to the traveling output shaft 47 via the input-side first transmission path 50(1), the planetary gear mechanism 30, and the output-side first transmission path 70(1).

In the first gear transmission state, the first element (internal gear 36 in this embodiment) of the planetary gear mechanism 30 functions as a reference power input section for inputting reference rotation power from the driving shaft 212, and the second element (carrier 38 in this embodiment) functions as a combined power output section for outputting a traveling rotation power toward the traveling output shaft 47.

Note that, as illustrated in FIG. 2, a mission case 300 accommodating the transmission structure 1A includes a front case portion 301 having the HST 10 attached on a front surface thereof in a separation available manner and a rear case portion 302 accommodating the PTO clutch mechanism 285 (refer to FIG. 1), the PTO multistage gear shift mechanism 290 (refer to FIG. 1), and the differential mechanism 260. The front case portion 301 and the rear case portion 302 are separably connected to each other in a vehicle body front-rear direction.

The planetary gear mechanism 30, the input-side first to third transmission paths 50(1) to 50(3), the input-side first to third clutch mechanisms 60(1) to 60(3), the output-side first to third transmission paths 70(1) to 70(3), and the output-side first to third clutch mechanisms 80(1) to 80(3) that are included in the transmission structure 1A are accommodated in and supported by the front case portion 301. Note that the forward transmission mechanism 400F, the reverse transmission mechanism 400R, the forward clutch mechanism 410F, and the reverse clutch mechanism 410R, that form the output-side first to third transmission paths 70(1) to 70(3) are accommodated in and supported by the rear case portion 302.

In this embodiment, the rear case portion 302 has an opening at a front end thereof and an intermediate wall 3021 for bearing and supporting in a middle portion in the forward-rearward direction, and further has a connection space portion 303 in a portion forward relative to the intermediate wall 3021.

Each of the driving shaft 212, the intermediate shaft 155, and the traveling output shaft 47 has a front portion rotatably supported by the front case portion 301 and a rear portion rotatably supported by the rear case portion 302. When the front case portion 301 and the rear case portion 302 are coupled to each other in a state in which a mounting flange formed around a front end of the rear case portion 302 is brought into contact with a rear end wall 3011 of the front case portion 301, front half portions of the driving shaft 212, the intermediate shaft 155, and the traveling output shaft 47 and rear half portions of the driving shaft 212, the intermediate shaft 155, and the traveling output shaft 47 rotatably supported by the rear case portion 302 face each other in the space portion 303 and are operatively connected to each other via joints.

At a rear end portion of the driving shaft 212 that projects from the rear end wall 3011 of the front case portion 301, an oil passage continuous cylinder 800 for supplying and discharging hydraulic oil from the valve block 112, not illustrated, to the clutch mechanisms 60(1) and 60(3) and for supplying lubricant oil is mounted. Similarly, at rear end portions of the intermediate shaft 155 and the traveling output shaft 47, oil passage continuous cylinders 810 and 820 are mounted on the clutch mechanisms 80(1) to 80(3).

A rear shaft end of the second transmission shaft 152 that is operatively connected to the carrier 38 of the planetary gear mechanism 30 and that supports the input-side first and third driven gear 54(1) and 54(3) in a relative rotation available manner projects from the rear end wall 3011 of the front case portion 301, and an oil passage continuous cylinder 830 is mounted for supplying lubricant oil to various portions which are to receive lubricant oil and which are located in near the second transmission shaft 152 via oil passages included in the second transmission shaft 152.

At a front end portion of the traveling output shaft 47 that projects from the intermediate wall 3021 of the rear case portion 302, an oil passage continuous cylinder 840 is mounted for supplying and discharging hydraulic oil to and from the forward clutch mechanism 410F and the reverse clutch mechanism 410R and for supplying lubricant oil.

In this way, since the oil passage continuous cylinders 800 to 840 are integrally disposed in the space portion 303 located in a portion where the front case portion 301 and the rear case portion 302 are connected to each other, the transmission structure 1A can be efficiently assembled and the oil passage continuous cylinders 800 to 840 can be efficiently connected to the valve block 112.

Figure 3:
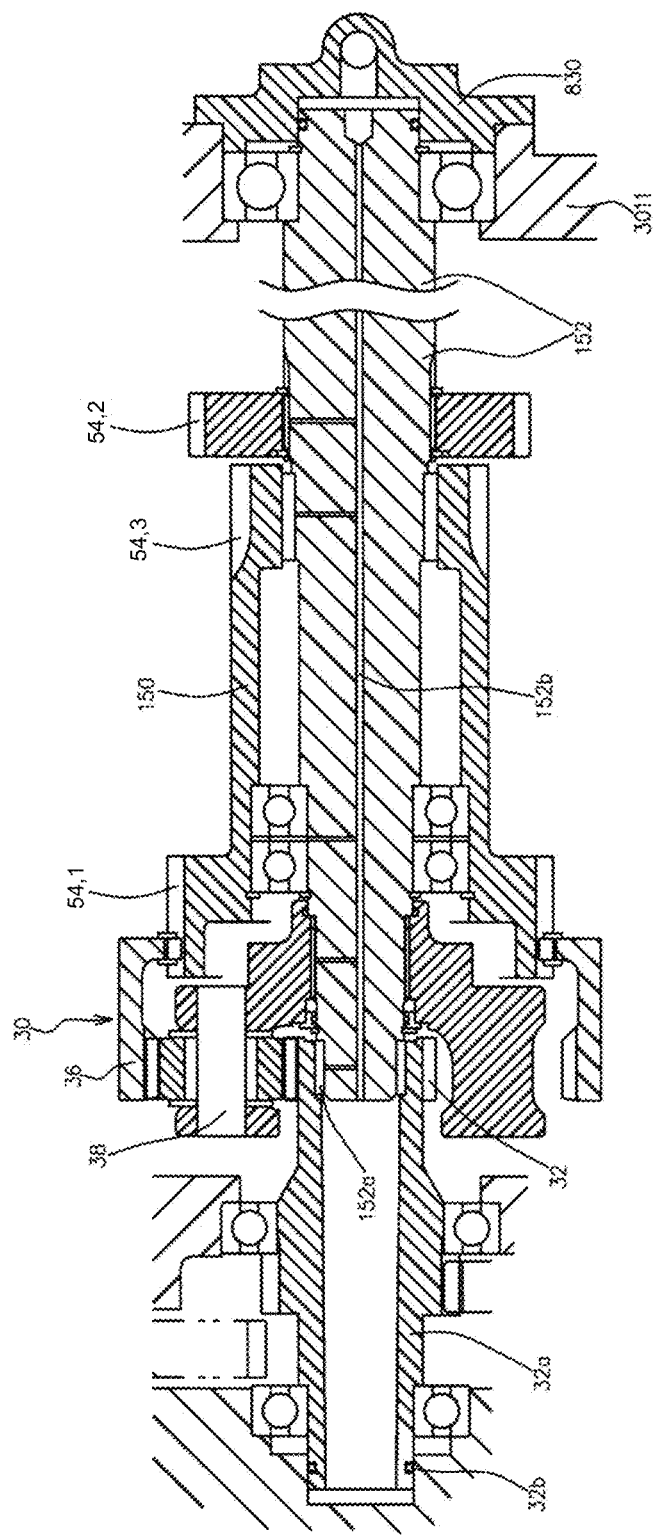
FIG. 3 is a partial enlarged view of the transmission structure.

FIG. 3 is an enlarged view of an important portion of FIG. 2. A hollow sun gear shaft 32a is formed integrally with the sun gear 32 disposed coaxially at a front end of the second transmission shaft 152. The sun gear shaft 32a is rotatably supported by bearings between a front end wall of the front case portion 301 and an HST case, and the sun gear 32 is disposed at a rear end portion protruding into the front case portion 301. A tip end of the second transmission shaft 152 is inserted into a hollow portion of the sun gear shaft 32a, and the sun gear shaft 32a and the second transmission shaft 152 are relatively rotatably supported by each other via a needle bearing 152a disposed at the same position as the sun gear 32 in an axial direction.

Lubricant oil supplied from the oil passage continuous cylinder 830 is further supplied via an oil passage 152b included in the second transmission shaft 152 to the needle bearing 152a which is one of the portions which are to receive lubricant oil. Furthermore, the lubricant oil is also supplied to a bearing disposed on the second transmission shaft 152 for relatively rotatably and idly supporting the input-side first and third driven gears 54(1) and 54(3), and a spline for fixedly supporting the carrier 38 and the input-side second driven gear 54(2) in a relative rotation unavailable manner, which are individually branched from the oil passage 152b, as the portions which are to receive lubricant oil.

A front end surface of the second transmission shaft 152 is positioned in the sun gear shaft 32a, and the oil passage 152b is opened to the hollow portion of the sun gear shaft 32a. A seal ring 32b is interposed between an outer peripheral surface portion of the sun gear shaft 32a extending forward from a front end bearing support portion and an inner peripheral surface of a depression section of the HST case for receiving the outer peripheral surface portion. By setting a slight gap between the seal ring 32b and the HST case, the lubricating oil can be supplied toward the front end bearing supporting the sun gear shaft 32a while being stored in the sun gear shaft 32a.

As illustrated in FIG. 4, the input-side first transmission path 50(1) and the output-side first transmission path 70(1) serving as a power transmission path in the first gear transmission state and the planetary gear mechanism 30 are set such that, assuming that an output of the gear shift output device (HST 10 in this embodiment) is the first speed, a rotation speed of the second element (that is, a rotation speed of the traveling output shaft 47) becomes zero and the rotation speed of the second element (that is, rotation speed of traveling output shaft 47) is increased as an output of the gear shift output device is changed in speed from the first speed to the second speed.

In the second gear transmission state that appears when the input-side second clutch mechanism 60(2) and the output-side second clutch mechanism 80(2) are brought into an engaged state and the remaining input-side clutch mechanisms (input-side first and third clutch mechanisms 60(1) and 60(3)) and the remaining output-side clutch mechanisms (output-side first and third clutch mechanisms 80(1) and 80(3)) are brought into a disengaged state, a rotation power of the driving shaft 212 is transmitted to the traveling output shaft 47 via the input-side second transmission path 50(2), the planetary gear mechanism 30, and the output-side second transmission path 70(2).

In the second gear transmission state, the second element of the planetary gear mechanism 30 operates as the reference power input section, and the first element functions as the combined power output section.

The input-side first and second transmission paths 50(1) and 50(2), the planetary gear mechanism 30, and the output-side first and second transmission paths 70(1) and 70(2) are described as below.

Specifically, a rotation speed of the second element driven for rotation by a driving force transmitted via the input-side second transmission path 50(2) in the second gear transmission state is set to be substantially the same as a rotation speed of the second element obtained when an output of the gear shift output device is the second speed in the first gear transmission state. A rotation speed of the first element obtained when an output of the gear shift output device is the second speed in the second gear transmission state is set to be substantially the same as a rotation speed of the first element driven for rotation by a driving force transmitted via the input-side first transmission path 50(1) in the first gear transmission state. Note that the term "substantially the same" includes, in addition to a case where a result is obtained in a setting of a strict gear ratio of the transmission paths 50(1), 50(2), 70(1), and 70(2) and the planetary gear mechanism 30, a state in which a rotation speed difference exists to the extent sorbable by slip between members forming each of the traveling system transmission paths, e.g., friction plates at a time of engagement of the hydro multiple plate clutch described below.

As illustrated in FIG. 4, a gear shift available range of the first element functioning as the combined power output section in the second gear transmission state is in a higher speed range than a gear shift available range of the second element functioning as the combined power output section in the first gear transmission state. In the second gear transmission state, as an output of the gear shift output device is changed from the second speed to the first speed, the rotation speed of the first element (that is, a rotation speed of the traveling output shaft 47) is increased.

In the third gear transmission state that appears when the input-side third clutch mechanism 60(3) and the output-side third clutch mechanism 80(3) are brought into an engaged state and the remaining input-side clutch mechanisms (input-side first and second clutch mechanisms 60(1) and 60(2)) and the remaining output-side clutch mechanisms (output-side first and second clutch mechanisms 80(1) and 80(2)) are brought into a disengaged state, a rotation power of the driving shaft 212 is transmitted to the traveling output shaft 47 via the input-side third transmission path 50(3), the planetary gear mechanism 30, and the output-side third transmission path 70(3).

In the third gear transmission state, the first element of the planetary gear mechanism 30 operates as the reference power input section, and the second element operates as the combined power output section.

The input-side first and third transmission paths 50(2) and 50(3), the planetary gear mechanism 30, and the output-side second and third transmission paths 70(2) and 70(3) are set as below.

Specifically, a rotation speed of the first element driven for rotation by a driving force transmitted via the input-side third transmission path 50(3) in the second gear transmission state is set to be substantially the same as a rotation speed of the first element obtained when an output of the gear shift output device is the first speed in the second gear transmission state. Furthermore, a rotation speed of the second element obtained when an output of the gear shift output device is the first speed in the third gear transmission state is set to be substantially the same as a rotation speed of the second element driven for rotation by a driving force transmitted via the input-side second transmission path 50(2) in the second gear transmission state.

As illustrated in FIG. 4, a gear shift available range of the second element functioning as the combined power output section in the third gear transmission state is a higher speed range than a gear shift available range of the first element functioning as the combined power output section in the second gear transmission state. In the third gear transmission state, as an output of the gear shift output device is changed from the first speed to the second speed, the rotation speed of the second element (that is, a rotation speed of the traveling output shaft 47) is increased.

As illustrated in FIG. 4, the control device 100 changes the rotation speeds of the first and second elements as follows in accordance with a vehicle speed. For example, in a range in which an absolute value of a rotation speed of the traveling output shaft 47 detected by a vehicle speed sensor 195b (refer to FIG. 1) is smaller than a first vehicle speed X (that is, a rotation speed of the traveling output shaft 47 is in a range from −X to +X), the first gear transmission state is entered. In this case, when the gear shift operation member (190a or 190b) is operated to a vehicle stop position, an output of the gear shift output device is changed toward the first speed so that the rotation speed of the second element becomes zero speed and an output of the gear shift output device is changed toward the second speed in response to an acceleration operation performed on the gear shift operation member (190a or 190b) so that the rotation speed of the second element is increased. In a range in which an absolute value of the rotation speed of the traveling output shaft 47 is from the first vehicle speed X to a second vehicle speed Y (that is, the rotation speed of the traveling output shaft 47 is in a range from −X to −Y and a range from +X to +Y), the control device 100 increases the rotation speed of the first element by changing an output of the gear shift output device to the first speed in response to an acceleration operation performed on the gear shift operation member (190a or 190b) while the second gear transmission state is entered.

For example, in a range in which an absolute value of the rotation speed of the traveling output shaft 47 exceeds the second vehicle speed Y (that is, the rotation speed of the traveling output shaft 47 exceeds +Y), the control device 100 enters the third gear transmission state. In this case, the rotation speed of the second element is increased by changing an output of the gear shift output device to the second speed in response to an acceleration operation performed on the gear shift operation member (accelerator pedal 190a or main shift lever 190b) so that the rotation speed of the second element is increased.

Note that, as illustrated in FIG. 1, the transmission structure 1A further includes a lowest speed setting member 851 and a highest speed setting member 853 in a portion in the vicinity of a driver's seat of the vehicle 200. Reference numerals 852 and 854 in FIG. 1 denote sensors for detecting operating positions of the lowest speed setting member 851 and the highest speed setting member 853, respectively.

Figure 5:
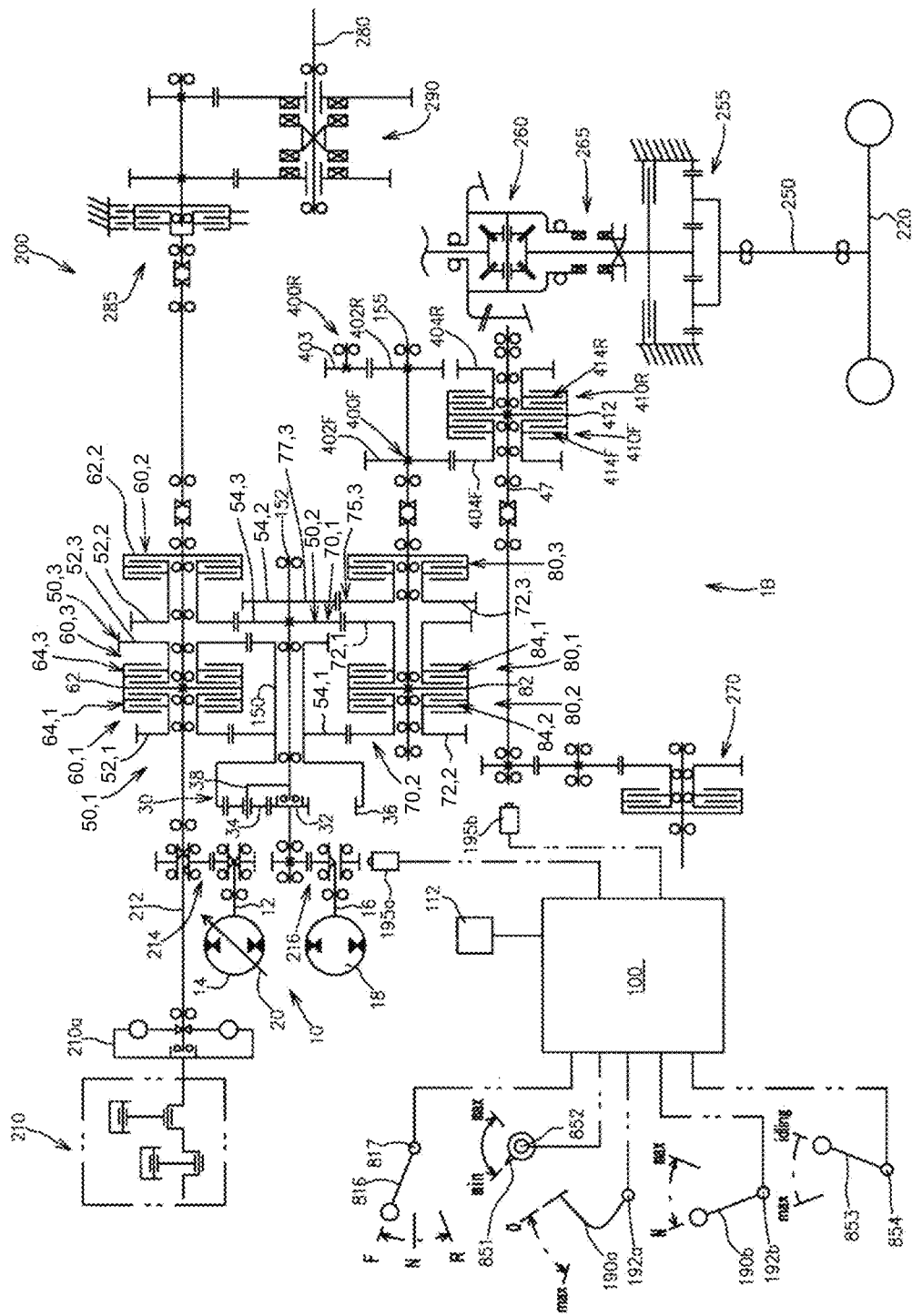
FIG. 5 is a diagram schematically illustrating power transmission of a work vehicle to which a transmission structure according to a modification of the first embodiment is applied.

FIG. 5 is a diagram schematically illustrating power transmission of a work vehicle 200 to which a transmission structure 1B according to a modification of this embodiment is applied.

Note that, in FIG. 5, the same reference numerals are given to the same members as in this embodiment.

The transmission structure 1B of this modification is different from the transmission structure 1A in that the output-side third clutch mechanism 80(3) is supported by the intermediate shaft 155.

Specifically, the transmission structure 1B of the modification has an output-side third transmission path 75(3) instead of the output-side third transmission path 70(3), when compared with the transmission structure 1A of this embodiment.

As illustrated in FIG. 5, the output-side third transmission path 75(3) includes the second transmission shaft 152, an output-side third driving gear 77(3) supported by the second transmission shaft 152 in a relative rotation unavailable manner, and the output-side third gear 72(3) meshed with the output-side third driving gear 77(3) while being supported by the intermediate shaft 155 in a relative rotation available manner.

In the transmission structure 1B of the modification, the output-side third clutch mechanism 80(3) is supported by the intermediate shaft 155 so that power transmission from the output-side third gear 72(3) to the intermediate shaft 155 is engaged or disengaged.

In the transmission structure 1B of this configuration, the forward transmission mechanism 400F and the reverse transmission mechanism 400R form a portion of the output-side third transmission path 75(3) while forming portions of the output-side first and second transmission paths 70(1) and 70(2).

Second Embodiment

Figure 6:
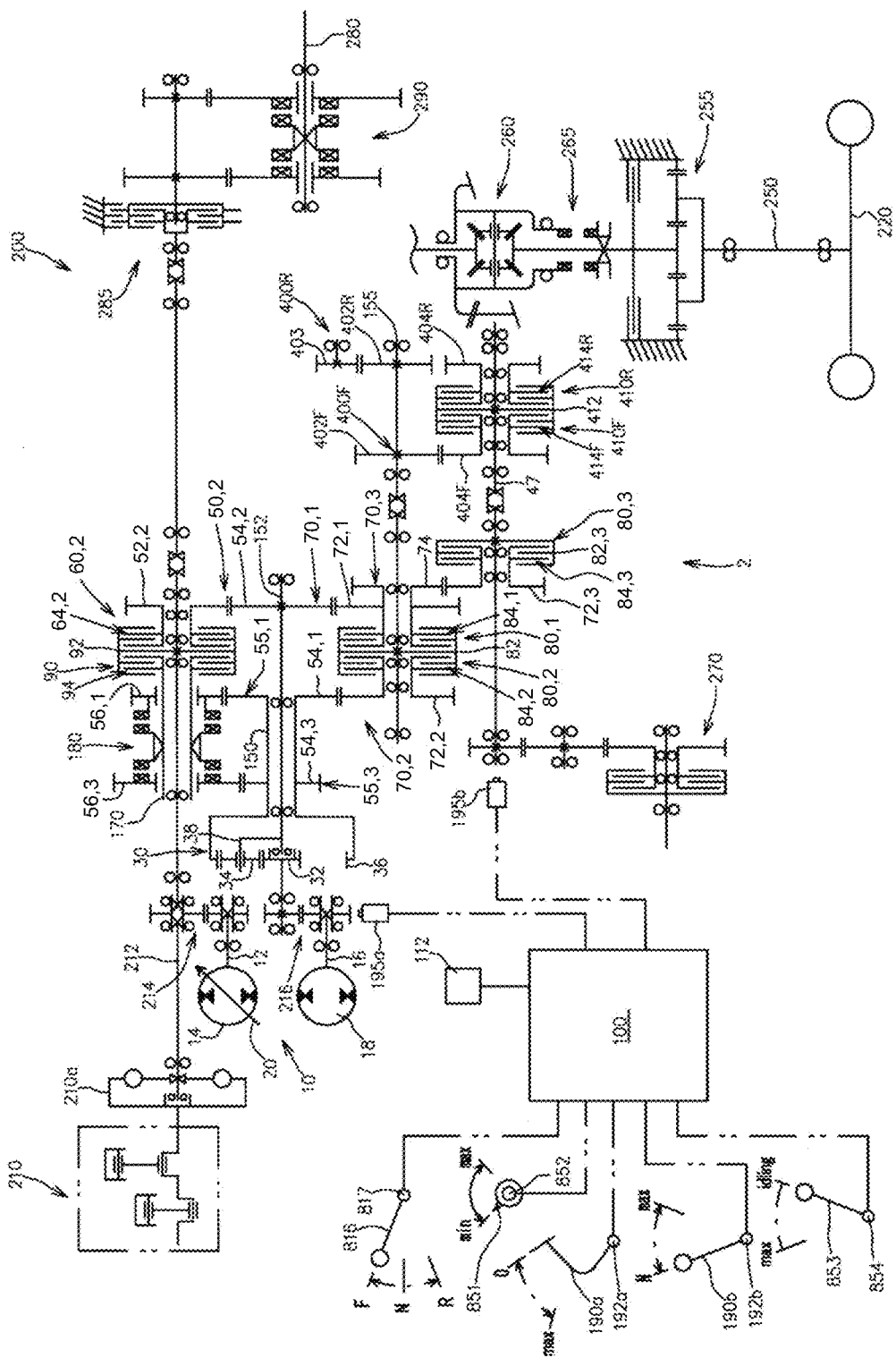
FIG. 6 is a diagram schematically illustrating power transmission of a work vehicle to which a transmission structure according to a second embodiment of the present invention is applied.
Figure 7:
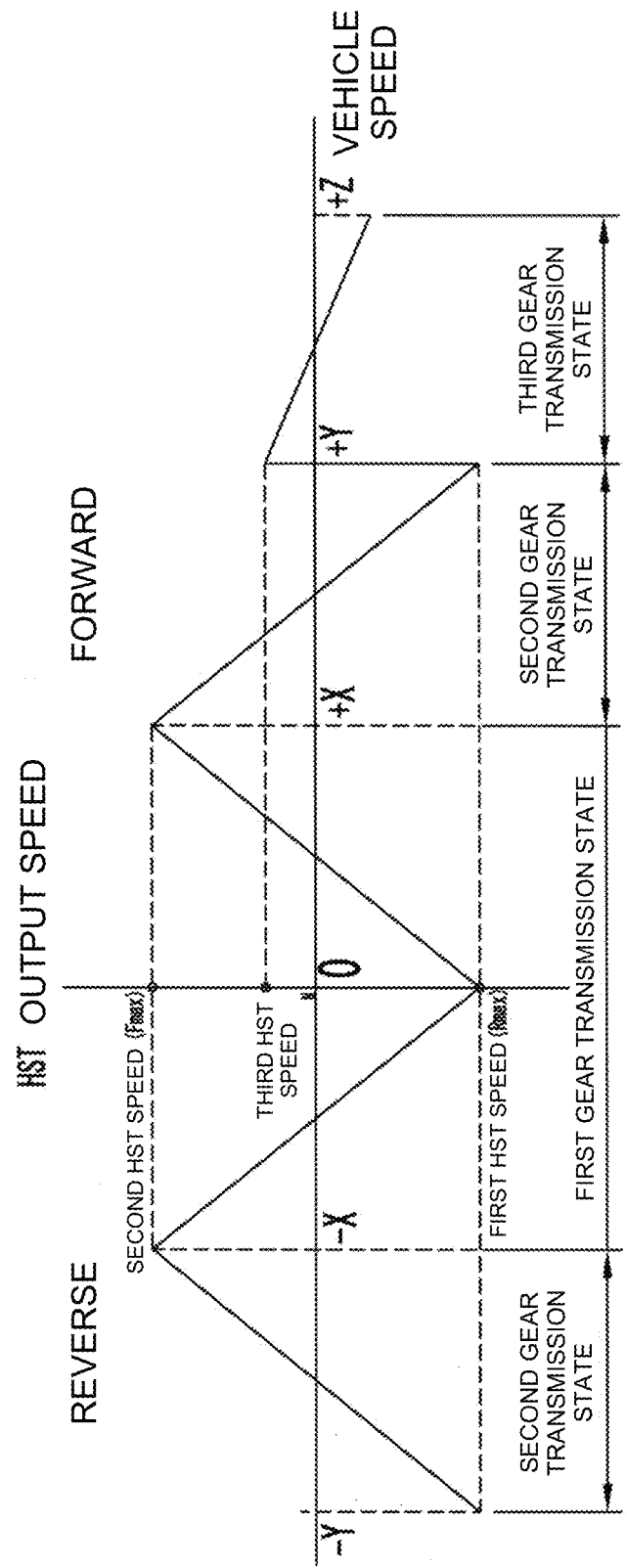
FIG. 7 is a graph illustrating the relationship between an output rotation speed of an HST in a transmission structure according to the related art and an output rotation speed (vehicle speed) of the transmission structure.

Hereinafter, a transmission structure according to another embodiment of the present invention is described with reference to the accompanying drawings. FIG. 6 is a schematic diagram illustrating power transmission in a work vehicle 200 to which a transmission structure 2 according to this embodiment is applied.

Note that, in FIG. 6, the same reference numerals are given to the same members as in this embodiment.

The transmission structure 2 according to this embodiment is different from the transmission structure 1A according to the first embodiment in that the input-side first and third transmission paths 50(1) and 50(3) are changed to input-side first and third transmission paths 55(1) and 55(3).

Specifically, as illustrated in FIG. 6, the transmission structure 2 includes the gear shift output device (HST 10), the planetary gear mechanism 30, an input shaft 170, the input-side first transmission path 55(1), the input-side second transmission path 50(2), the input-side third transmission path 55(3), an input shaft clutch mechanism 90, a shifter, the input-side second clutch mechanism 60(2), the output-side first to third transmission paths 70(1) to 70(3), the output-side first to third clutch mechanism 80(1) to 80(3), the gear shift operation member (axle pedal 190a and main gear change lever 190b), and the control device 100.

The input shaft clutch mechanism 90 engages and disengages power transmission from the driving shaft 212 to the input shaft 170.

As illustrated in FIG. 6, in this embodiment, the input shaft 170 has a hollow shaft shape, and is externally inserted into the driving shaft 212 in a relative rotation available manner.

The input shaft clutch mechanism 90 is a hydraulic multiple plate clutch. In detail, the input shaft clutch mechanism 90 includes an input shaft clutch housing 92 supported by the driving shaft 212 in a relative rotation unavailable manner, an input shaft friction plate group 94 that includes an input shaft driving-side friction plate supported by the input shaft clutch housing 92 in a relative rotation unavailable manner and an input shaft driven-side friction plate supported by the input shaft in a relative rotation unavailable manner while facing the input shaft driving-side friction plate, and an input shaft piston (not illustrated) that frictionally engages the input shaft friction plate group.

Note that, in this embodiment, the input-side second clutch mechanism 60(2) doubles as the input shaft clutch housing 92 of the input shaft clutch mechanism 90 (that is, in this embodiment, the input-side second clutch housing 62(2) is omitted).

The input-side first transmission path 55(1) transmits rotation power from the input shaft 170 to the first element 36.

In detail, as illustrated in FIG. 6, the input-side first transmission path 55(1) includes an input-side first driving gear 56(1) supported by the input shaft 170 in a relative rotation available manner, the input-side first driven gear 54(1), and the first transmission shaft 150.

The input-side third transmission path 55(3) transmits rotation power from the input shaft 170 to the first element 36.

Specifically, as illustrated in FIG. 6, the input-side third transmission mechanism 55(3) includes an input-side third driving gear 56(3) supported by the input shaft 170 in a relative rotation available manner, the input-side third driven gear 54(3), and the first transmission shaft 150.

The shifter 180 selectively couples the input shaft 170 to the input-side first transmission path 55(1) or the input-side third transmission path 55(3).

In this embodiment, the shifter 180 is movable in an axial direction relative to the input shaft 170 in a relative rotation unavailable manner, and may be positioned in a first transmission path selection position where the shifter 180 is coupled to the input-side first driving gear 56(1), a third transmission path selection position where the shifter 180 is coupled to the input-side third driving gear 56(3), and a non-selection position where the shifter 180 is not coupled to any of the input-side first and third driving gears 56(1) and 56(3).

The shifter 180 is operated by an electric motor or an electric actuator, such as a push-pull linear solenoid, that is operatively controlled by the control device 100.

In this embodiment, the control device 100 performs operation control as described below.

When an absolute value of a rotation speed of the traveling output shaft 47 is in a range until the first vehicle speed X, in a state in which the input shaft 170 is operatively coupled to the input-side first transmission path 55(1) by the shifter 180, the input shaft clutch mechanism 90 and the output-side first clutch mechanism 80(1) are brought into an engaged state and the other clutch mechanisms (that is, the input-side second clutch mechanism 60(2), the output-side second and third clutch mechanisms 80(2) and 80(3)) are disengaged, so that the first gear transmission state is entered. In this case, when the gear shift operation member (axle pedal 190*a* and main gear shift lever 190*b*) is operated to be moved to a vehicle stop position, an output of the gear shift output device is changed toward the first speed and the rotation speed of the second element is changed to a zero speed. Furthermore, the rotation speed of the second element is increased by changing an output of the gear shift output device to the second speed in response to an acceleration operation performed on the gear shift operation member (accelerator pedal 190*a* or main shift lever 190*b*) so that the rotation speed of the second element is increased.

In a range in which an absolute value of a rotation speed of the traveling output shaft 47 is from the first vehicle speed X to the second vehicle speed Y, the input-side second clutch mechanism 60(2) and the output-side second clutch mechanism 80(2) are brought into an engaged state and the other clutch mechanisms (that is, the input shaft clutch mechanism 90 and the output-side first and third clutch mechanisms 80(1) and 80(3)) are disengaged, so that the second gear transmission state is entered. In this case, the rotation speed of the first element is increased by changing an output of the gear shift output device to the first speed in response to an acceleration operation performed on the gear shift operation member (accelerator pedal 190*a* and main shift lever 190*b*).

In a range in which an absolute value of a rotation speed of the traveling output shaft 47 exceeds the second vehicle speed Y, in a state in which the input shaft 170 is operatively coupled to the input-side third transmission path 55(3) by the shifter 180, the input shaft clutch mechanism 90 and the output-side third clutch mechanism 80(3) are brought into an engaged state and the other clutch mechanisms (that is, the input-side second clutch mechanism 60(2) and the output-side first and second clutch mechanisms 80(1) and 80(2)) are disengaged, so that the third gear transmission state is entered. In this case, the rotation speed of the second element is increased by changing an output of the gear shift output device to the second speed in response to an acceleration operation performed on the gear shift operation member (accelerator pedal 190*a* and main shift lever 190*b*).

The control device 100 causes the shifter 180 to couple the input shaft 170 to the input-side third transmission path 55(3) in advance so that the third gear preparation state is entered at a time when a rotation speed of the traveling output shaft 47 reaches a shift-up preparation speed which is lower by a predetermined speed than the second vehicle speed Y when the second gear transmission state is shifted up the third gear transmission state, whereas the control device 100 causes the shifter 180 to couple the input shaft 170 to the input-side first transmission path 55(1) in advance so that the first gear preparation state is entered at a time when the rotation speed of the traveling output shaft 47 reaches a shift-down preparation speed which is higher by a predetermined speed than the first vehicle speed X when the second gear transmission state is shifted down to the first gear transmission state.

Alternatively, the control device 100 may cause the shifter 180 to connect the input shaft 170 to the input-side third transmission path 55(3) so that the third gear preparation state is entered when the rotation speed of the traveling output shaft 47 is increased in the second gear transmission state, and cause the shifter 180 to connect the input shaft 170 to the input-side first transmission path 55(1) so that the first gear preparation state is entered when the rotation speed of the traveling output shaft 47 is lowered in the second gear transmission state.

Alternatively, the control device 100 may perform substantially at the same time a shift from an engaged state to a disengaged state of the input-side and output-side second clutch mechanisms 60(2) and 80(2), a shift from a disengaged state to an engaged state of the input shaft clutch mechanism, a shift from a disengaged state to an engaged state of the input shaft clutch mechanism 90, a shift of the shifter 180 to the third transmission path selection position, and a shift from a disengaged state to an engaged state of the output-side third clutch mechanism 80(3) when shifting up the second gear transmission state to the third gear transmission state, whereas the control device 100 may perform substantially at the same time a shift from an engaged state to a disengaged state of the input-side and output-side second clutch mechanisms 60(2) and 80(2), a shift from a disengaged state to an engaged state of the input shaft clutch mechanism 90, a shift of the shifter 180 to the first transmission path selection position, and a shift from an engaged state to a disengaged state of the output-side first clutch mechanism 80(3).

REFERENCE SIGNS LIST 1A, 1B, 2 transmission structure
10 HST (gear shift output device)
30 planetary gear mechanism
32 sun gear (third element)
36 internal gear (first element)
38 carrier (second element)
47 traveling output shaft
50(1) to 50(3) input-side first to third transmission paths
52(1) to 52(3) input-side first to third driving gears
54(1) to 54(3) input-side first to third driven gears
55(1) input-side first transmission path
55(3) input-side third transmission path
56(1) input-side first driving gear
56(3) input-side third driving gear
60(1) to 60(3) input-side first to third clutch mechanisms
70(1) to 70(3) output-side first to third transmission paths
72(1) to 72(3) output-side first to third gears
74 output-side intermediate gear
75(3) output-side third transmission path
77(3) output-side third driving gear
80(1) to 80(3) output-side first to third clutch mechanisms
90 input shaft clutch mechanism
100 control device
150 first transmission shaft
152 second transmission shaft
155 intermediate shaft
170 input shaft
180 shifter
190a accelerator pedal (gear shift operation member)
190b main shift lever (gear shift operation member)
210 driving source
212 driving shaft
400F, 400R forward and reverse transmission mechanisms
410F, 410R forward and reverse clutch mechanisms

The invention claimed is:
1. A transmission structure that continuously shifts rotation power of a driving shaft operatively coupled to a driving source and that transmits the rotation power to a traveling output shaft that outputs the rotation power to driving wheels, the transmission structure comprising:
a gear shift output device that outputs gear shift rotation power which is continuously variable at least between a first speed and a second speed;
a planetary gear mechanism that includes first to third elements and that inputs the gear shift rotation power to the third element;
an input-side first transmission path that transmits rotation power of the driving shaft to the first element;
an input-side second transmission path that transmits the rotation power of the driving shaft to the second element;
an input-side third transmission path that transmits the rotation power of the driving shaft to the first element;
input-side first to third clutch mechanisms that are inserted into the input-side first to third transmission paths, respectively;
an output-side first transmission path that transmits rotation power of the second element to the traveling output shaft;
an output-side second transmission path that transmits rotation power of the first element to the traveling output shaft;
an output-side third transmission path that transmits the rotation power of the second element to the traveling output shaft;
output-side first to third clutch mechanisms that are inserted into the output-side first to third transmission paths, respectively;
a gear shift operation member; and
a control device that operatively controls the gear shift output device, the input-side first to third clutch mechanisms, and the output-side first to third clutch mechanisms,
wherein, the control device
enters, in a range in which an absolute value of a rotation speed of the traveling output shaft is within a first vehicle speed, a first gear transmission state by bringing the input-side and output-side first clutch mechanisms into an engaged state and bringing the other input-side clutch mechanisms and the other output-side clutch mechanisms into a disengaged state, and
in this case, when the gear shift operation member is operated to a vehicle stop position, an output of the gear shift output device is changed to a first speed so that a rotation speed of the second element becomes zero speed and an output of the gear shift output device is changed toward the second speed in response to an acceleration operation performed on the gear shift operation member so that the rotation speed of the second element is increased,
enters, in a range in which the absolute value of the rotation speed of the traveling output shaft is from the first vehicle speed to a second vehicle speed, a second gear transmission state by bringing the input-side and output-side second clutch mechanisms into an engaged state and bringing the other input-side clutch mechanisms and the other output-side clutch mechanisms into a disengaged state, and
in this case, the rotation speed of the first element is increased by changing an output of the gear shift output device toward the first speed in response to an acceleration operation performed on the gear shift operation member, and
enters, when the absolute value of the rotation speed of the traveling output shaft exceeds the second vehicle speed, a third gear transmission state by bringing the input-side and output-side third clutch mechanisms into an engaged state and bringing the other input-side clutch mechanisms and the other output-side clutch mechanisms into a disengaged state, and
in this case, the rotation speed of the second element is increased by changing an output of the gear shift output device toward the second speed in response to an acceleration operation performed on the gear shift operation member, and
wherein,
the rotation speed of the second element in the second gear transmission state is substantially the same as the rotation speed of the second element attained when the output of the gear shift output device is the second speed in the first gear transmission state,
the rotation speed of the first element attained when the output of the gear shift output device is the second speed in the second gear transmission state is substantially the same as the rotation speed of the first element in the first gear transmission state, the rotation speed of the first element in the third gear transmission state is substantially the same as the rotation speed of the first element attained when the output of the gear shift output device is the first speed in the second gear transmission state, and the rotation speed of the second element attained when the output of the gear shift output device is the first speed in the third gear transmission state is substantially the same as the rotation speed of the second element in the second gear transmission state.

2. The transmission structure according to claim 1, further comprising:

a first transmission shaft operatively coupled to the first element;

a second transmission shaft operatively coupled to the second element;

input-side first and third driving gears supported by the driving shaft in a relative rotation available manner while being operatively coupled to the first transmission shaft; and an input-side second driving gear supported by the driving shaft in a relative rotation available manner while being operatively coupled to the second transmission shaft, wherein, the input-side first to third clutch mechanisms engage and disengage power transmission from the driving shaft to the input-side first to third driving gears, respectively, the second transmission shaft is disposed coaxially with the planetary gear mechanism, and the first transmission shaft is externally inserted to the second transmission shaft in a relative rotation available manner.

3. A transmission structure that continuously shifts rotation power of a driving shaft operatively coupled to a driving source and that transmits the rotation power to a traveling output shaft that outputs the rotation power to driving wheels, the transmission structure comprising:

a gear shift output device that outputs gear shift rotation power which is continuously variable at least between a first speed and a second speed;

a planetary gear mechanism that includes first to third elements and that inputs the gear shift rotation power to the third element;

an input shaft;

an input-side first transmission path operatively coupled to the first element;

an input-side second transmission path that transmits the rotation power of the driving shaft to the second element;

an input-side third transmission path operatively coupled to the first element;

an input shaft clutch mechanism that engages and disengages power transmission from the driving shaft to the input shaft;

a shifter that operatively couples the input shaft to the input-side first and third transmission paths in a selectable manner;

an input-side second clutch mechanism that is inserted to the input-side second transmission path;

an output-side first transmission path that transmits rotation power of the second element to the traveling output shaft;

an output-side second transmission path that transmits rotation power of the first element to the traveling output shaft;

an output-side third transmission path that transmits the rotation power of the second element to the traveling output shaft;

output-side first to third clutch mechanisms that are inserted into the output-side first to third transmission paths, respectively;

a gear shift operation member; and a control device that operatively controls the gear shift output device, the input-side first to third clutch mechanisms, and the output-side first to third clutch mechanisms, wherein, the control device enters, in a range in which an absolute value of a rotation speed of the traveling output shaft is within a first vehicle speed, a first gear transmission state by bringing the input shaft clutch mechanism and the output-side first clutch mechanism into an engaged state and bringing the other clutch mechanisms into a disengaged state while the input shaft is operatively coupled to the input-side first transmission path by the shifter, and in this case, when the gear shift operation member is operated to a vehicle stop position, an output of the gear shift output device is changed to a first speed so that a rotation speed of the second element becomes zero speed and an output of the gear shift output device is changed toward the second speed in response to an acceleration operation performed on the gear shift operation member so that the rotation speed of the second element is increased, enters, in a range in which the absolute value of the rotation speed of the traveling output shaft is from the first vehicle speed to a second vehicle speed, a second gear transmission state by bringing the input-side and output-side second clutch mechanisms into an engaged state and bringing the other clutch mechanisms into a disengaged state, and in this case, the rotation speed of the first element is increased by changing an output of the gear shift output device toward the first speed in response to an acceleration operation performed on the gear shift operation member, enters, when the absolute value of the rotation speed of the traveling output shaft exceeds the second vehicle speed, a third gear transmission state by bringing the input shaft clutch mechanism and the output-side third clutch mechanism into an engaged state and bringing the other clutch mechanisms into a disengaged state while the input shaft is operatively coupled to the input-side third transmission path by the shifter, and in this case, the rotation speed of the second element is increased by changing an output of the gear shift output device toward the second speed in response to an acceleration operation performed on the gear shift operation member, and wherein, the rotation speed of the second element in the second gear transmission state is substantially the same as the rotation speed of the second element attained when an output of the gear shift output device is the second speed in the first gear transmission state, the rotation speed of the first element attained when the output of the gear shift output device is the second speed in the second gear transmission state is substantially the same as the rotation speed of the first element in the first gear transmission state, the rotation speed of the first element in the third gear transmission state is substantially the same as the rotation speed of the first element attained when the output of the gear shift output device is the first speed in the second gear transmission state, and the rotation speed of the second element attained when an output of the gear shift output device in the third gear transmission state is a first speed is substantially the same as the rotation speed of the second element in the second gear transmission state.

4. The transmission structure according to claim 3, wherein the control device causes the shifter to couple the input shaft to the input-side third transmission path in advance so that a third gear preparation state is entered at a time when a rotation speed of the traveling output shaft reaches a shift-up preparation speed which is lower by a predetermined speed than the second vehicle speed when the second gear transmission state is shifted up to the third gear transmission state, and causes the shifter to couple the input shaft to the input-side first transmission path in advance so that a first gear preparation state is entered at a time when a rotation speed of the traveling output shaft reaches a shift-down preparation speed which is higher by a predetermined speed than the first vehicle speed when the second gear transmission state is shifted down to the first gear transmission state.

5. The transmission structure according to claim 3, wherein the control device causes the shifter to couple the input shaft to the input-side third transmission path so that a third gear preparation state is entered when a rotation speed of the traveling output shaft is increased in the second gear transmission state, and causes the shifter to couple the input shaft to the input-side first transmission path so that a first gear preparation state is entered when a rotation speed of the traveling output shaft is lowered in the second gear transmission state.

6. The transmission structure according to claim 3, further comprising:

a first transmission shaft operatively coupled to the first element;

a second transmission shaft operatively coupled to the second element;

input-side first and third driving gears supported by the input shaft in a relative rotation available manner while being operatively coupled to the first transmission shaft; and an input-side second driving gear supported by the driving shaft in a relative rotation available manner while being operatively coupled to the second transmission shaft, wherein, the shifter couples the input shaft to the input-side first and third driving gears in a selectable manner, the input-side second clutch mechanism engages and disengages power transmission from the driving shaft to the input-side second driving gear, the second transmission shaft is disposed coaxially with the planetary gear mechanism, and the first transmission shaft is externally inserted to the second transmission shaft in a relative rotation available manner.

7. The transmission structure according claim 1, further comprising:

input-side first and third driven gears that are supported by the first transmission shaft in a relative rotation unavailable manner and that are operatively coupled to the input-side first and third driving gears, respectively; and an input-side second driven gear that is supported by the second transmission shaft in a relative rotation unavailable manner and that is operatively coupled to the input-side second driving gear, wherein, the input-side first transmission path includes the input-side first driving gear, the input-side first driven gear, and the first transmission shaft, the input-side second transmission path includes the input-side second driving gear, the input-side second driven gear, and the second transmission shaft, and the input-side third transmission path includes the input-side third driving gear, the input-side third driven gear, and the first transmission shaft.

8. The transmission structure according to claim 1, further comprising:

an intermediate shaft disposed between the first and second transmission shafts and the traveling output shaft in a transmission direction;

an output-side first gear supported by the intermediate shaft in a relative rotation available manner while being operatively coupled to the second transmission shaft;

an output-side second gear supported by the intermediate shaft in a relative rotation available manner while being operatively coupled to the first transmission shaft; and an output-side third gear supported by the traveling output shaft in a relative rotation available manner while being operatively coupled to the second transmission shaft, wherein, the output-side first and second clutch mechanisms engage and disengage power transmission from the output-side first and second gears to the intermediate shaft, respectively, and the output-side third clutch mechanism engages and disengages power transmission from the output-side third gear to the traveling output shaft.

9. The transmission structure according to claim 8, wherein the output-side first gear is operatively coupled to the second transmission shaft through the input-side second driven gear, the output-side second gear is operatively coupled to the first transmission shaft through the input-side first driven gear, and the output-side third gear is operatively coupled to the second transmission shaft through the output-side first gear.

10. The transmission structure according to claim 9, further comprising:

an output-side intermediate gear coupled to the output-side first gear in a relative rotation unavailable manner while being supported by the intermediate shaft in a relative rotation available manner, wherein the output-side third gear is operatively coupled to the output-side intermediate gear.

11. The transmission structure according to claim 10, further comprising:

a forward transmission mechanism and a reverse transmission mechanism that are capable of operatively transmitting rotation power of the intermediate shaft to the traveling output shaft as forward rotation power and reverse rotation power; and a forward clutch mechanism and a reverse clutch mechanism that engage and disengage power transmission of the forward transmission mechanism and the reverse transmission mechanism, respectively, wherein the forward transmission mechanism and the reverse transmission mechanism constitute a portion of the output-side first transmission path and a portion of the output-side second transmission path, respectively.

\* \* \* \* \*